United States Patent [19]
Yuen et al.

[11] Patent Number: 5,991,645
[45] Date of Patent: *Nov. 23, 1999

[54] WIRELESS TELEPHONE HEADSET SYSTEM WITH AUTOMATIC LOG ON/LOG OFF DETECTION

[75] Inventors: Barry K. Yuen, Fremont; Dwight D. Lynn, Santa Cruz, both of Calif.

[73] Assignee: GN Netcom, Inc., Scotts Valley, Calif.

[*] Notice: This patent is subject to a terminal disclaimer.

[21] Appl. No.: 08/469,481

[22] Filed: Jun. 6, 1995

Related U.S. Application Data

[63] Continuation-in-part of application No. 08/354,237, Dec. 12, 1994, Pat. No. 5,926,543, which is a continuation of application No. 08/062,614, May 11, 1993, Pat. No. 5,488,657, which is a continuation of application No. 07/844,739, Mar. 2, 1992, Pat. No. 5,226,077.

[51] Int. Cl.⁶ ........................................... H04Q 7/32
[52] U.S. Cl. ............................................... 455/568
[58] Field of Search ................................. 379/61, 58, 395, 379/269, 268; 455/89, 90, 568

[56] References Cited

U.S. PATENT DOCUMENTS

| | | | |
|---|---|---|---|
| 3,571,518 | 3/1971 | Chipman et al. | 179/27 |
| 3,851,111 | 11/1974 | Young | 179/51 |
| 4,048,452 | 9/1977 | Oehring et al. | 179/27 |
| 4,197,430 | 4/1980 | Dowden | 179/27 |
| 4,400,587 | 8/1983 | Taylor et al. | 179/27 |
| 4,449,017 | 5/1984 | Burke et al. | 179/27 |
| 4,450,319 | 5/1984 | Lucey | 379/61 X |
| 4,484,029 | 11/1984 | Kenney | 455/89 X |
| 4,499,337 | 2/1985 | Elbaek | 179/27 |
| 4,562,310 | 12/1985 | Watters et al. | 179/100 |
| 4,620,066 | 10/1986 | Bushnell et al. | 179/27 |
| 4,672,663 | 6/1987 | Tomasi | 379/388 |
| 4,682,354 | 7/1987 | Vanacore | 379/211 |
| 4,882,745 | 11/1989 | Silver | 379/61 |
| 4,951,310 | 8/1990 | Honda et al. | 379/266 |
| 4,974,251 | 11/1990 | Ohta et al. | 379/61 |
| 5,062,103 | 10/1991 | Davidson et al. | 370/58.1 |
| 5,073,890 | 12/1991 | Danielsen | 370/58.2 |
| 5,113,428 | 5/1992 | Fitzgerald | 379/61 |
| 5,226,077 | 7/1993 | Lynn et al. | 379/395 |
| 5,280,541 | 1/1994 | Marko et al. | 379/58 X |
| 5,488,657 | 1/1996 | Lynn et al. | 379/395 |

*Primary Examiner*—Daniel S. Hunter
*Attorney, Agent, or Firm*—Limbach & Limbach L.L.P.

[57] ABSTRACT

Existing automatic log on/log off systems in telephone systems determine whether or not a workstation is occupied and whether calls can be directed to that workstation by determining whether or not the amplifier that provides the interface between the telephone system and the occupant's headset is plugged into the workstation. Recent headsets have included a connector in the cord between the headset and the amplifier, enabling the occupant to leave the workstation without unplugging the amplifier. However, this defeats the sensing mechanism of the existing automatic log on/log off system. A wireless telephone headset system according to the present invention replaces the existing wired amplifier and headset assembly and includes a detector for determining whether a wireless communication link exists between the headset and the amplifier, and an activator for activating the existing automatic log on/log off system in the telephone system. In the preferred embodiment, the detector senses both interruption and reestablishment of the wireless communication link between the headset and the amplifier, and the activator activates both current-sensing and voltage/resistance-sensing automatic log on/log off systems.

29 Claims, 13 Drawing Sheets

WIRELESS TELEPHONE HEADSET SYSTEM WITH AUTOMATIC LOG ON/LOG OFF DETECTION

RELATED APPLICATIONS

This is a Continuation-In-Part of application U.S. Ser. No. 08/354,237, filed Dec. 12, 1994, and entitled "Headset Amplifier With Automatic Log On/Log Off Detection," which issued as U.S. Pat. No. 5,926,543, which is a Continuation of application U.S. Ser. No. 08/062,614, filed May 11, 1993, and entitled "Apparatus for and Method of Operating an Automatic Log On/Log Off Circuit In a Telephone System By Disconnecting a Headset," which issued as U.S. Pat. No. 5,488,657, which is a Continuation of application U.S. Ser. No. 07/844,739, filed Mar. 2, 1992, and entitled "Headset Amplifier With Automatic Log On/Log Off Detection," which issued as U.S. Pat. No. 5,226,077 on Jul. 6, 1993.

BACKGROUND OF THE INVENTION

Telephone headsets are an important element of modern business equipment. They provide hands-free communication, and improve productivity, in a variety of applications, such as operator and information services.

One of the main applications of telephone headsets is in connection with automatic in-bound and out-bound telephone systems. Such systems generally include an Automatic Call Distributor (ACD). In a telephone system with an ACD, a computer automatically routes telephone calls to workstations connected to the system in a way that balances the call load equally between the workstations. Each workstation can be occupied by a telephone representative. For a telephone system with ACD to work properly, each telephone representative is required to log on to the system each time he/she occupies his/her workstation, and to log off the system each time he/she leaves his/her workstation. This is necessary so that the ACD will route calls to all occupied workstations, and will not route calls to any unoccupied workstations. If a representative leaves his/her workstation without logging off, the ACD system will continue to route calls to that workstation. Such calls are not responded to, or a response is delayed. A representative failing to log on to the system increases the load on the other representatives, and increases the time required to respond to incoming calls. The failure of a representative either to log on to or log off the system consequently results in a reduced quality of service.

The need for a telephone system to determine whether a workstation is occupied is not restricted to telephone systems with an ACD. For example, the sole telephone operator in a small office is also required to log off when away from his/her workstation so that incoming calls do not go unanswered.

To improve the quality of service provided by telephone systems in which the presence of a representative or operator at a workstation impacts the quality of service, it is desirable that logging on and logging off be automated.

A typical workstation includes a telephone headset connected to an amplifier. The amplifier is, in turn, connected to the workstation, which is connected to the telephone system. The amplifier is powered by current drawn from the telephone system. Automated log on/log off systems are known in which the representative has to unplug the amplifier from the workstation to log off automatically. The automatic log on/log off system monitors each workstation to determine whether or not an amplifier is connected to the workstation. The system logs the representative off when it determines that the amplifier has been disconnected from the workstation. Some types of automatic log on/log off system log the representative back on when it determines that the amplifier has been re-connected to the workstation. Other types require the representative to log back in manually.

Such automatic log on/log off systems determine whether the amplifier is connected to the workstation by monitoring some parameter that depends on whether or the amplifier is connected, such as the current drawn from the telephone system by the amplifier, or the resistance between a pair of contacts.

The log on/log off system just described is regarded as automatic, even though the representative has to connect or disconnect the amplifier, because operators prefer to continue to wear their headsets when away from their workstations, especially if the time away from the workstation is short. To be able to leave the workstation while wearing the headset, the representative has to unplug the amplifier, and has to carry the amplifier around while away from the workstation.

Recently, headset manufacturers have made it easier for a representative to leave his/her workstation while wearing his/her headset by providing a connector in the cord between the headset and the amplifier. The representative can then wear the headset while he/she is away from the workstation and no longer has to carry the amplifier. However, disconnecting the headset using the connector in the cord defeats the known automatic log in/log out systems, because the representative can leave the workstation without unplugging the amplifier, and disconnecting the headset using the connector in the cord does not change any of the parameters monitored by the known automatic log on/log off systems.

SUMMARY OF THE INVENTION

In accordance with the present invention, wireless communication is provided between a telephone headset and conventional automatic in-bound and out-bound telephone systems, including those with an ACD, while maintaining full automated log on/log off capability. A wireless telephone headset system in accordance with the present invention includes an amplifier and a telephone headset. The amplifier is for connecting to a telephone system which includes a monitor for monitoring when a peripheral device is connected thereto and detecting a change in a parameter which occurs when the peripheral device is disconnected therefrom. Together, the amplifier and telephone headset are for establishing a wireless communication link therebetween for communicating signals between the telephone headset and the telephone system.

One embodiment of the amplifier in accordance with the present invention includes a detector and an activator. The detector is for detecting an interruption of a wireless communication link between the telephone headset and the amplifier and providing an output signal in accordance therewith. The activator, coupled to the detector, is for receiving the output signal and in accordance therewith changing the parameter in a manner which emulates a disconnection of a peripheral device from the telephone system even though the amplifier remains connected to the telephone system. In another embodiment of the amplifier, where the telephone system monitor is further for detecting a change in the parameter which occurs when the peripheral device is reconnected to the telephone system, the detector is further for detecting when the wireless communication link is reestablished between the telephone headset and the amplifier and in accordance therewith providing another output signal, and the activator is further for changing the parameter, in accordance with the other output signal, in a manner which emulates a reconnection of the peripheral device to the telephone system even though the amplifier has not been disconnected.

One embodiment of the telephone headset in accordance with the present invention includes a detector and a controller. The detector is for detecting an interruption of the wireless communication link between the telephone headset and the amplifier and providing an output signal in accordance therewith. The controller, coupled to the detector, is for receiving the output signal and in accordance therewith providing one or more control signals for controlling one or more operating parameters of the telephone headset. In another embodiment of the telephone headset, where the telephone system monitor is further for detecting a change in the parameter which occurs when the peripheral device is reconnected to the telephone system, the detector is further for detecting when the wireless communication link is reestablished between the telephone headset and the amplifier and in accordance therewith providing another output signal, and the controller is further for providing one or more other control signals, in accordance with the other output signal, for further controlling the one or more operating parameters of the telephone headset.

These and other features and advantages of the present invention will be understood upon consideration of the following detailed description of the invention and the accompanying drawings.

DETAILED DESCRIPTION OF THE INVENTION

Figure 1:
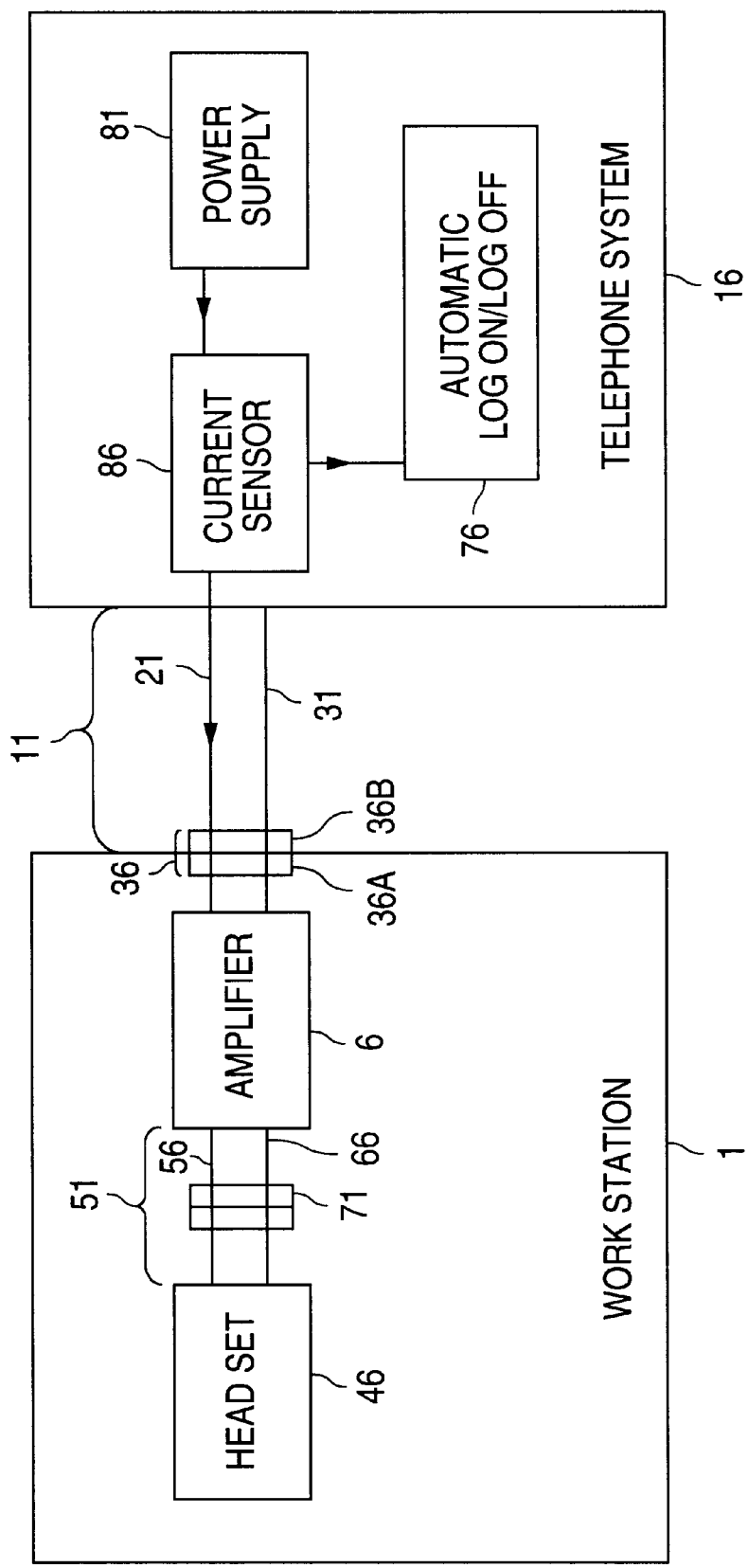
FIG. 1 is a block diagram of a telephone system with a conventional automatic log on/log off system that determines whether or not the amplifier is connected by sensing the current drawn from the telephone system.

A typical telephone system with an automatic log on/log off system is shown in FIG. 1. The workstation 1, which is normally one of several workstations connected to the telephone system 16, has an amplifier 6 to provide an interface between the telephone system 16 and the headset 46. The cord 11 connects the amplifier to the telephone system 16. The amplifier is powered by the telephone system, and draws a current of several milliamps from the telephone system. The cord 11 includes the conductor 21 for DC power and the conductor 31, which provides the ground connection. The transmit signal from the amplifier 6 is normally superimposed on the conductor 21. Alternatively, an additional conductor (not shown) in the cord 11 may be used for the transmit signal. Finally the cord 11 includes receive conductors, which have been omitted for clarity. The cord 11 is interrupted by the connector 36, comprising the plug 36A and the socket 36B, which is normally mounted on the workstation 1. The connector 36 allows the amplifier 6 and the headset 46 to be disconnected from the workstation.

The headset 46 includes an earphone (not shown) and a microphone (not shown). Typically, an electret microphone is used, which requires that the amplifier 6 supply DC power of a few volts at between 25 and several hundred microamps to the headset. The cord 51 interconnects the headset and the amplifier. The cord 51 includes the conductor 56 for DC power and the conductor 66, which provides the ground connection. The transmit signal from the microphone in the headset (not shown) is normally superimposed on the conductor 56. Alternatively, an additional conductor (not shown) may be used for the transmit signal. Finally, the cord 51 includes receive conductors, which have been omitted for clarity. The cord 51 is interrupted by the connector 71, comprising the plug 71A and the socket 71B. The connector 71 enables the representative to disconnect the headset from the amplifier when he/she leaves the workstation 1. Normally, the connector 71 is mounted in the cord 51 close to the headset, but it can be an integral part of the headset or an integral part of the amplifier.

Applications handling a large volume of telephone calls, such as telemarketing, bank customer service, or airline reservations, have a plurality of workstations, each with its own telephone connector 36, amplifier 6, headset 46 and necessary interconnecting cords. The workstations are connected to the telephone system 16. The telephone system may include an Automatic Call Distributor (ACD) for distributing the calls evenly between occupied workstations, i.e., workstations at which a representative is logged on. Smaller telephone systems lack an ACD, but the invention can be applied to a telephone system without an ACD.

The telephone system 16 includes an automatic log on/log off system 76 that automatically logs a workstation off the telephone system when the occupant leaves the workstation. Some automatic log-on/log off systems automatically log the workstation back onto the telephone system when the occupant returns. Other automatic log on/log off systems require the occupant to log back in manually.

The cord 11 connects the amplifier 6 to the telephone system 16. When the amplifier 6 is disconnected from the telephone system 16, the automatic log on/log off system 76 causes the telephone system to take an action that is appropriate in view of the fact that the workstation is no longer occupied. For example, in a small office system with a single telephone operator, it can cause the telephone system to go temporarily into its night service mode so that incoming calls do not go unanswered. In a large system with ACD, it prevents the telephone system from directing calls to the unoccupied workstation. When the amplifier 6 is re-connected to the telephone system 16, the automatic log on/log off system 76 may cause the telephone system to reverse the action previously taken, or the occupant may have to log back in manually.

FIG. 1 shows a telephone system 16 with an automatic log on/log off system controlled by the current sensor 86 that detects whether or not the amplifier 6 is connected to the telephone system by monitoring the current drawn by the amplifier from the telephone system. Current from a power supply 81 in the telephone system is supplied to the conductor 21, and to the amplifier 6, through the current sensor 86. The current sensor 86 provides an output signal to the automatic log on/log off system 76. When the current supplied to the amplifier is greater than a threshold value, typically about one milliamp, the current sensor 86 provides an output signal in a first state that indicates that the amplifier is connected to the telephone system. When the current supplied to the amplifier is less than the threshold value, the current sensor provides an output signal in a second state that indicates that the amplifier has been disconnected from the telephone system. The state of the output signal from the current sensor thus informs the automatic log on/log off system 76 whether or not the amplifier 6 is connected to the telephone system 16, and the automatic log on/log off system can thus cause the telephone system to take appropriate action.

The connector 71 in the cord 51 between the amplifier 6 and the headset 46 enables the occupant to leave the workstation while continuing to wear his/her headset without having to disconnect the amplifier from the telephone system 16. This defeats the automatic log on/log off system. Because the current drawn from the telephone system 16 by the headset 46 is small compared with the total current drawn from the telephone system by the amplifier 6, it is not practical to change the threshold of the current sensor 86 to detect the change in the current drawn by the amplifier resulting from disconnecting the headset.

Figure 2:
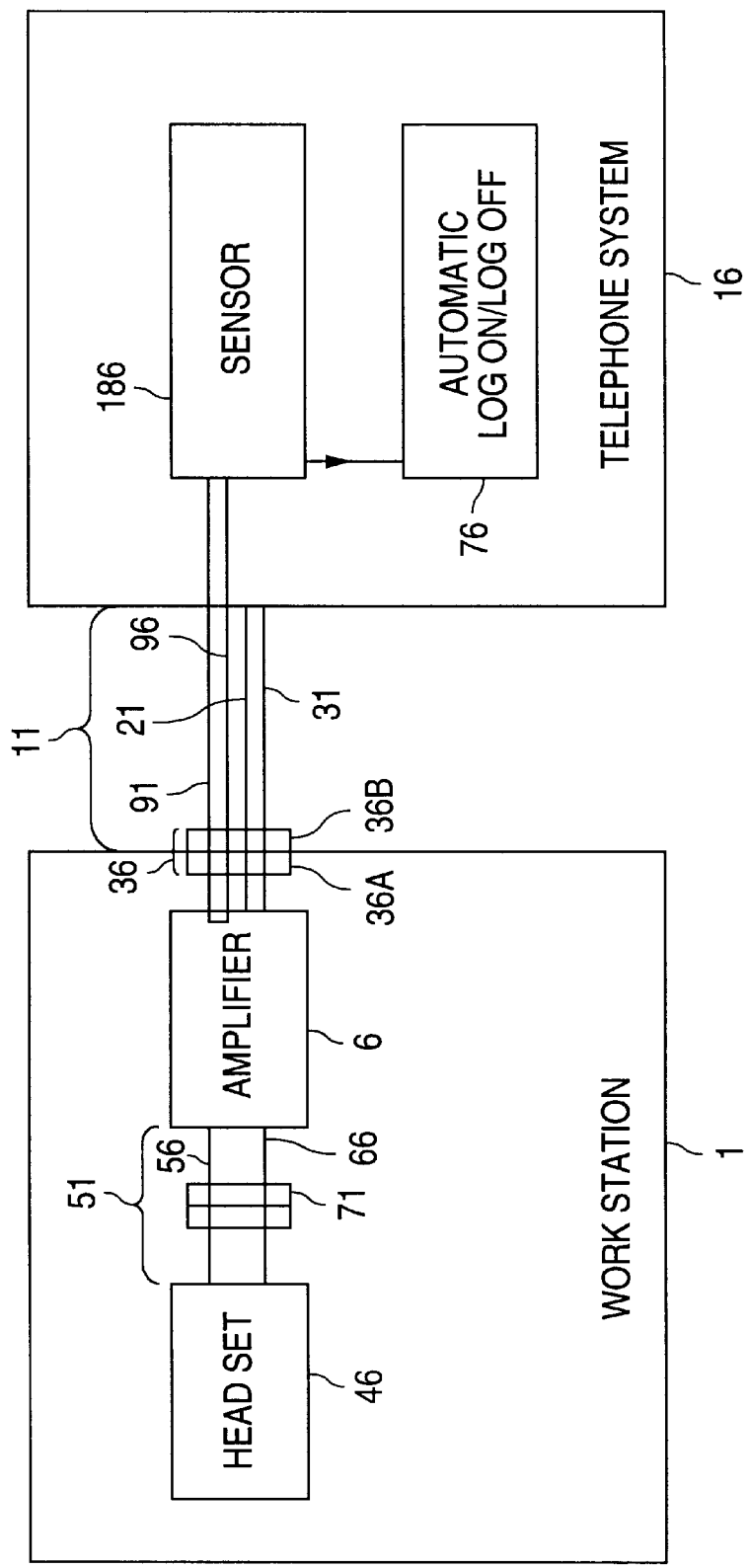
FIG. 2 is a block diagram of a telephone system with a conventional automatic log on/log off system that determines whether or not the amplifier is connected by sensing the resistance or voltage difference between two additional contacts.

FIG. 2 shows the telephone system of FIG. 1 fitted with a known alternative to the current sensor 86 (FIG. 1) for determining whether or not the amplifier 6 is connected to the telephone system 11. The cord 11 is provided with two additional conductors 91 and 96. The conductors are interconnected on the amplifier side of the connector 36. Inside the telephone system 16, the additional conductors 91 and 96 are connected to the sensor 186, which measures a parameter relating to the two additional conductors that depends on whether the amplifier 6 is connected to the telephone system 16. This could be the resistance between the conductors, a voltage difference between the conductors, an a.c. signal level, or some other suitable parameter. The sensor 186 provides an output signal to the automatic log on/log off system 76.

When, for example, the resistance between the additional conductors 91 and 96 is less than a threshold value, the sensor 186 provides an output signal in a first state that indicates that the amplifier is connected to the telephone system. When the resistance between the conductors is greater than the threshold value, the sensor 186 provides an output signal in a second state that indicates that the amplifier has been disconnected from the telephone system. The state of the output signal of the sensor 186 thus indicates to the automatic log on/log off system 76 whether or not the amplifier 6 is connected to the telephone system 16, and the automatic log on/log off system can thus cause the telephone system to take appropriate action.

As a common alternative to the arrangement shown in FIG. 2, the additional conductors 91 and 96 can be connected to the contacts of a switch on the socket 36B. The contacts are actuated by plugging the plug 36A into the socket 36B. When the plug 36A (typically a ¼ inch phone jack) is not plugged into the socket 36B, the contacts are in first condition, e.g., open; when the plug 36A is plugged into the socket 36B, the contacts change to a second condition, e.g., closed.

As an alternative to providing two additional conductors 91 and 96, the additional conductor 96 can be omitted. The sensor 186 would then monitor a parameter relating to the single conductor 91 and one of the other conductors 21 and 31 of the cord 11 that depends on whether the amplifier 6 is connected to the telephone system 16. For example, the additional conductor 91 can be connected to the power/signal conductor 21 on the plug 36A of the connector 36, which is connected to the amplifier. The sensor 186 then determines whether or not the voltage on the additional conductor 91 is substantially the same as the amplifier power supply voltage.

The connector 71 in the cord 51 between the amplifier 6 and the headset 46 enables the occupant of the workstation to leave the workstation while continuing to wear his/her headset without having to disconnect the amplifier 6 from the telephone system 16. This defeats the automatic log on/log off system because it does not change any parameter relating to the additional conductors 91 and 96, or relating to the additional conductor 91 and another conductor in the cord 11.

Figure 3:
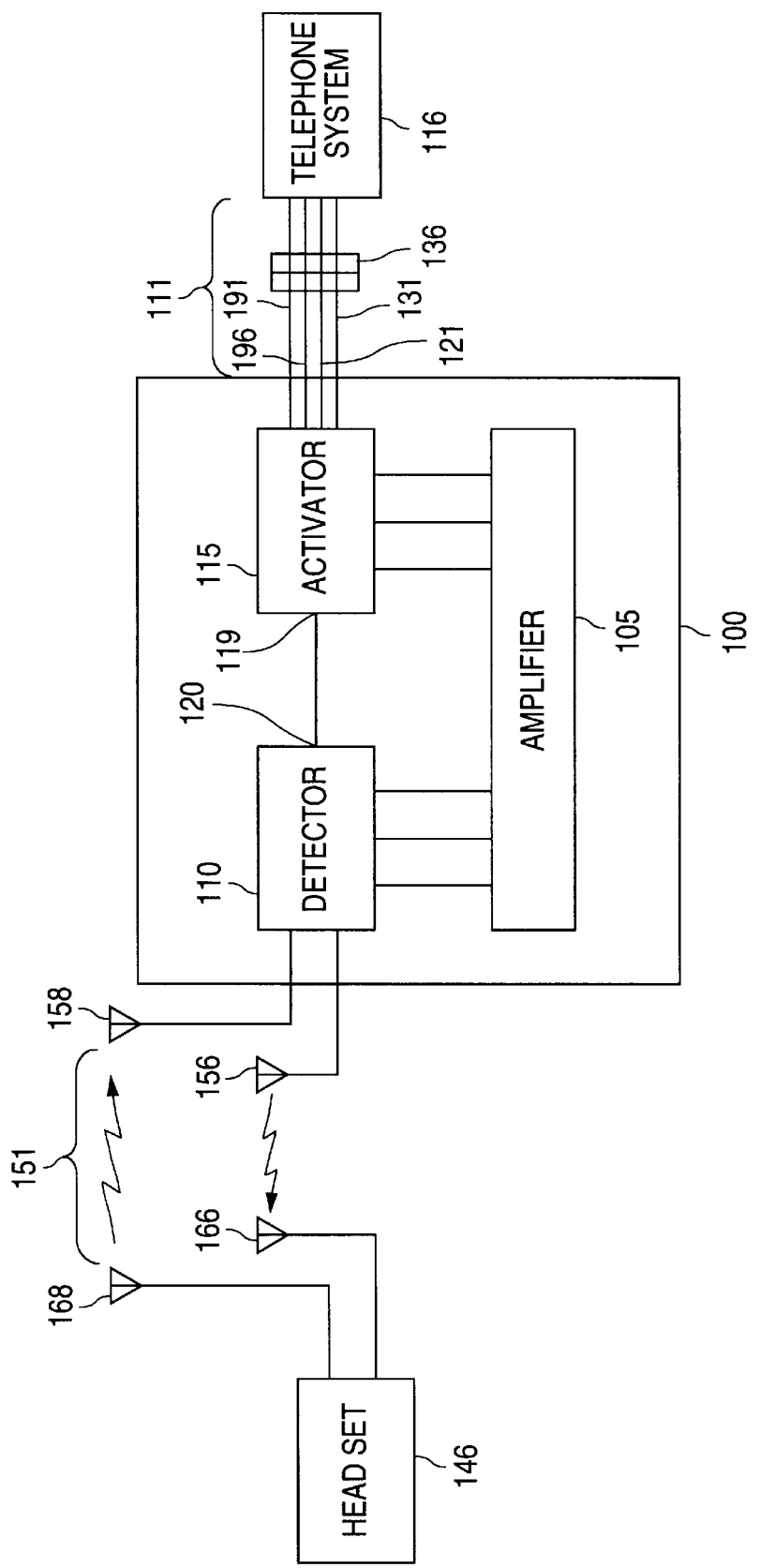
FIG. 3 is a block diagram of a wireless telephone headset system with automatic log on/log off detection according to the invention connected to a telephone system.

FIG. 3 shows a block diagram of an amplifier 100 according to the invention. As discussed in more detail below, the amplifier 100 communicates with the headset 146 over a wireless communication link 151 via wireless signal radiators (e.g. antennas) 156, 158, 166, 168. The amplifier is connected to the telephone system by the cord 111 that includes the connector 136, comprising the plug 136A and the socket 136B, the two conductors 121 and 131 for power/signal and ground, respectively. The cord 111 may also include the additional conductors 191 and 196. The conductors in the cords 111 and 151 are directly or indirectly connected to the amplifier electronics 105, and provides the necessary interface between the headset 146 and the telephone system 116. The amplifier electronics 105 are known and consequently details of them will not be shown.

The amplifier 100 according to the invention additionally includes the detector 110, to which wireless signal radiators 156 and 158 are connected for wireless signal transmission and reception, respectively, and the activator 115 to which one or more of the conductors of the cord 111 are connected.

As discussed in more detail below, the detector 110 monitors the wireless communication link 151 for detecting interruption and reestablishment thereof, i.e., to determine whether or not the workstation at which the amplifier 100 is located is occupied. The detector output 120 is connected to the control input 119 of the activator. The detector output 120 preferably provides a signal having one state when the headset 146 and amplifier 100 are communicating, and a second state when the headset 146 and amplifier 100 are not communicating.

Further, as also discussed in more detail below, the detector 110 and headset 146 each include transmitter and receiver circuits for transmitting and receiving wireless signals over the wireless communication link 151 via their respective wireless signal radiators 156, 158, 166, 168. In accordance with one embodiment of the present invention, the detector 110 and headset 146 transmit and receive radio frequency (RF) signals. In this embodiment, the receive signal radiator 158 and transmit signal radiator 168 for the detector 110 and headset 146, respectively, are each an RF antenna (preferably directional), while the transmit signal radiator 156 and receive signal radiator 166 for the detector 110 and headset 146, respectively, are each a magnetic antenna (preferably directional). In accordance with another embodiment of the present invention, the detector 110 and headset 146 each include transmitter and receiver circuits suitable for transmitting and receiving infrared (IR) signals. In this embodiment, the transmit signal radiators 156, 168 are IR-emitting elements, while the receive signal radiators 158, 166 are IR-sensitive elements.

The activator 115 activates the existing automatic log on/log off system in the telephone system 116 in response to the detector output 120. One or more of the conductors of the cord 111 are connected to the activator 115. Depending on the state of the output 120 of the detector 110, the activator 115 makes it appear to the automatic log on/log off system in the telephone system 116 as if the amplifier 100 is connected to or disconnected from the telephone system 116. The action of the activator 115 depends on what parameter the sensor controlling the automatic log on/log off system in the telephone system 116 monitors to determine whether or not the amplifier 100 is connected. For example, the activator 115 can include a controlled switch that is responsive to the detector output for emulating the effect of disconnecting the amplifier 100 from the telephone system 116. The controlled switch in the activator 115 switches the parameter that the sensor in the automatic log on/log off system in the telephone system 116 monitors to determine whether or not the amplifier 100 is connected to the telephone system 116.

For further example, an activator 115 for use with the telephone system 16 with the current sensing automatic log on/log off system shown in FIG. 1 changes the current drawn by the amplifier 100 from the telephone system 116 in response to the detector 110. When the detector 110 indicates that the headset 146 and amplifier 100 are not communicating, the activator 115 reduces the current drawn by the amplifier 100 to less than the threshold level of the current sensor 86 (FIG. 1) in the telephone system 116.

When the amplifier 100 draws less current than the threshold level of the current sensor, it appears to the current sensor, and hence to the automatic log on/log off system in the telephone system 116, as if the amplifier 100 has been disconnected from the telephone system 116. Accordingly, the automatic log on/log off system in the telephone system 116 logs off the workstation to which the amplifier 100 is connected.

Figure 4:
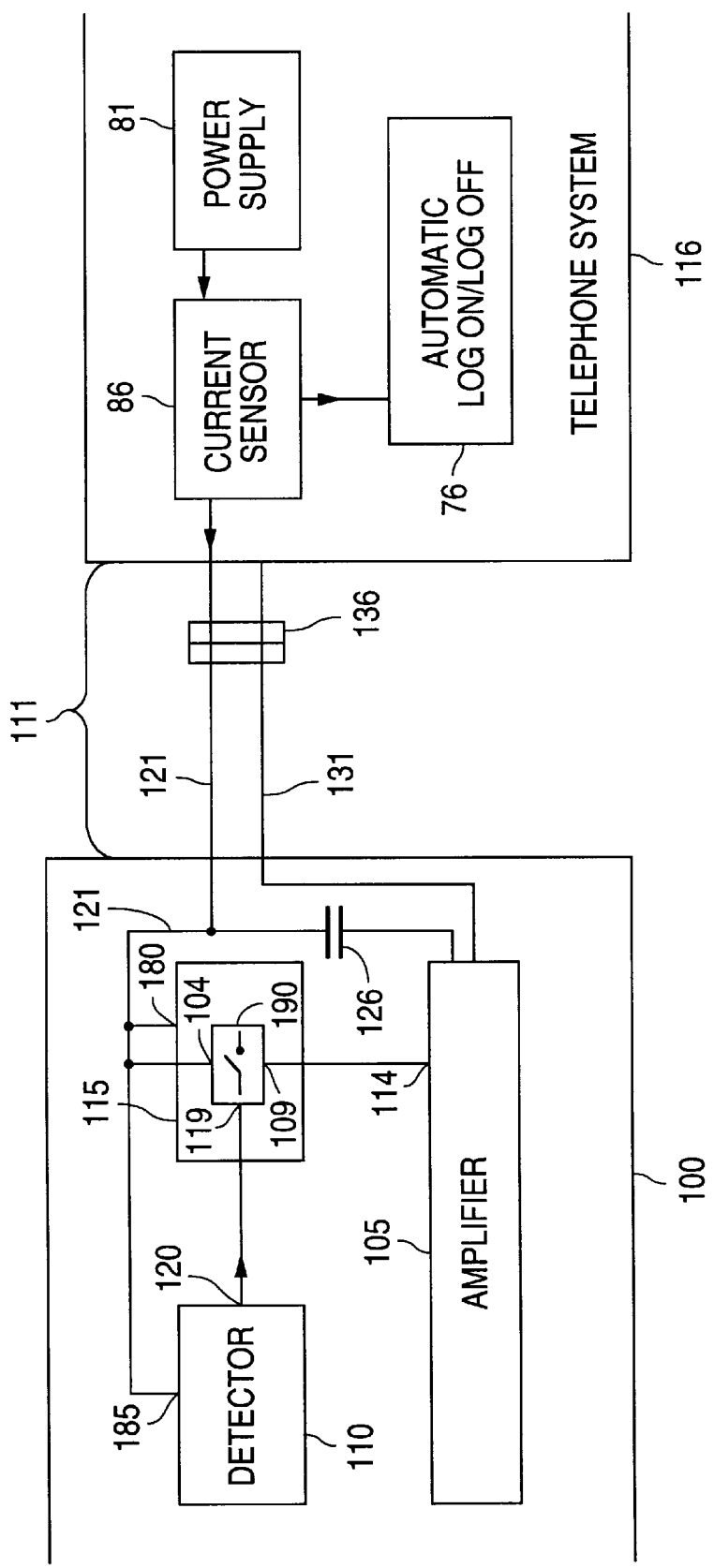
FIG. 4 is a block diagram of the activator part of a wireless telephone headset system with automatic log on/log off detection according to the invention in which the activator activates a current sensing type of automatic log on/log off system.

A version of the amplifier 100 for use with a telephone system having an automatic log on/log off system having a current sensor that senses the current drawn by the amplifier from the telephone system is shown in FIG. 4. In FIG. 4, the ground conductor 131 is connected directly from the telephone system 116 to the amplifier electronics 105. The conductor 121 is connected to the power supply input connections 180 and 185 of the activator 115 and the detector 110, respectively. The capacitor 126 couples the transmit output of the amplifier electronics to the power supply/signal conductor 121.

The conductor 121 is also connected to one of the switched terminals 104 of the controlled switch 190 in the activator 115. The other switched terminal 109 of the controlled switch is connected to the power supply input terminal 114 of the amplifier electronics 105. The detector output 120 is connected to the control input terminal 119 of the controlled switch.

The controlled switch 190 can be a relay, a transistor, an opto-relay or any other suitable switching device that can be controlled by a suitable control signal.

When detector output 120 is in one of its states, the controlled switch 190 is in its ON (conducting) state, and when the detector output 120 is in the other of its states, the controlled switch 190 is in its OFF (non-conducting) state. When the controlled switch is in its ON state, the amplifier electronics 105 draw current from the conductor 121 (and hence from the telephone system) through the controlled switch. To the current sensor 86 in the telephone system 116 that monitors the flow of current through the conductor 121, this appears the same as if the amplifier 100 were connected to the telephone system. When the controlled switch is in its OFF state, the amplifier electronics 105 draw no current from the conductor 121. To the current sensor 86 in the telephone system that monitors the flow of current through the conductor 121, this appears the same as if the amplifier 100 were disconnected from the telephone system. Thus, by controlling the current drawn from the telephone system 116 by the amplifier 100, the controlled switch 190 is able to control the automatic log on/log off system in the telephone system.

When the controlled switch 190 is in its OFF state, the detector 110 and the activator 115 continue to draw current from the telephone system 116. These circuits must therefore be designed such that together they draw significantly less current than the threshold current level of the current sensor 86 in the telephone system. The current drawn by the detector and the activator must be minimized especially when the controlled switch is in its OFF state, i.e., when the headset 146 is disconnected. For example, if a relay is used for the controlled switch 190, the normally-open contacts of the relay should be used to provide the switched contacts 104 and 109 so that the relay does not draw current in its OFF state.

As an alternative to switching the power supply to the amplifier electronics 105, the controlled switch 190 can switch the ground connection to the amplifier electronics. This enables an NPN transistor to be used for the controlled switch.

If the current sensor 86 controlling the automatic log on/log off system in the telephone system has a very low threshold, the detector 110 and the activator 115 should be connected to a power source that is not sensed by the current sensor 86 in the telephone system.

Figure 5:
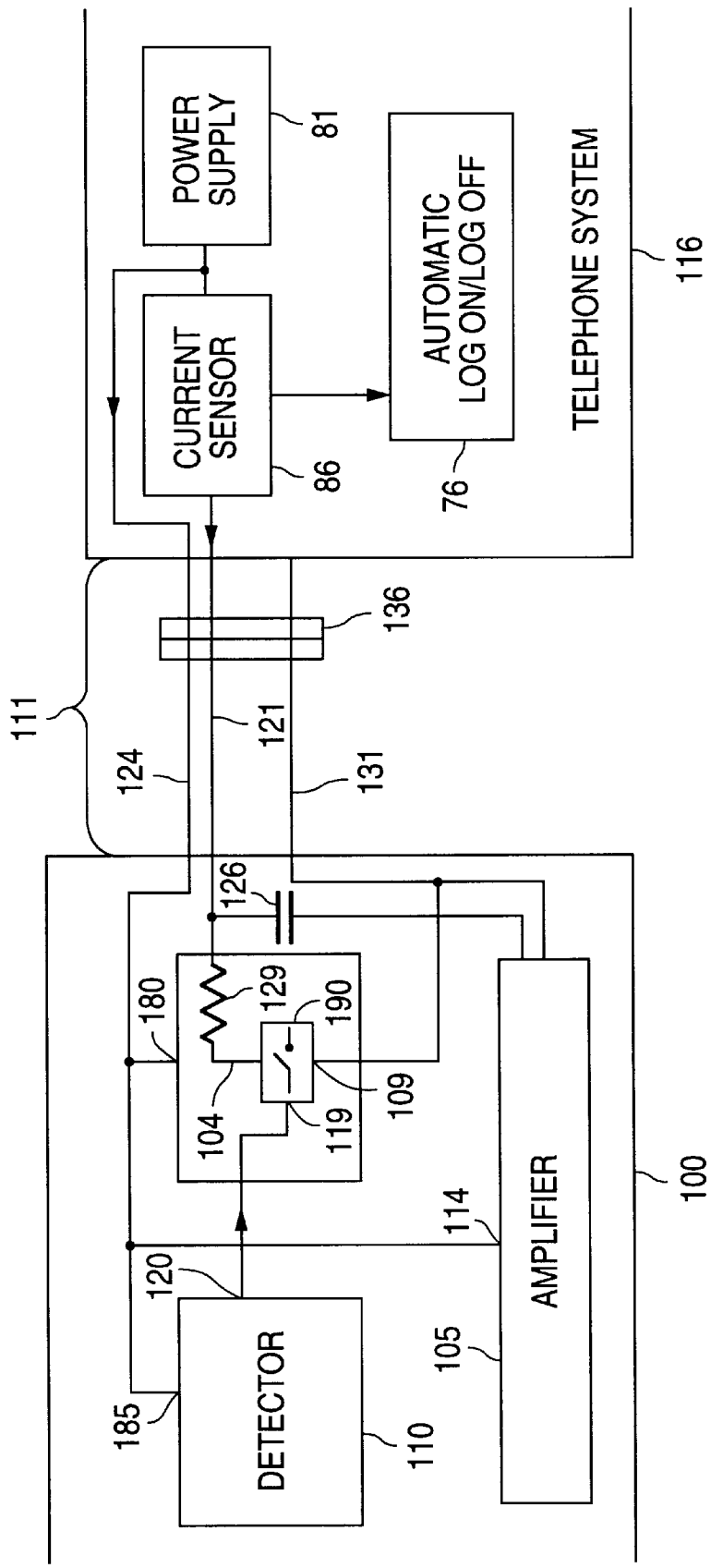
FIG. 5 is a block diagram of the activator part of a wireless telephone headset system with automatic log on/log off detection according to the invention in which the activator activates a current sensing type of automatic log on/log off system with a low current sensing threshold.

Alternatively, the detector 110, the activator 115, and the amplifier electronics 105 all can be powered from a power source that is not sensed by the current sensor 86 in the telephone system 116, as shown in FIG. 5. An additional conductor 124 is added to the cord 111. In the amplifier, the conductor 124 is connected to the power supply input terminals 185, 180, and 114 of the detector, the activator, and the amplifier electronics 105, respectively. The conductor 124 is connected directly to the power supply 81 in the telephone system, bypassing the current sensor 86. Alternatively, the additional conductor 124 can be dispensed with, and the amplifier 100 can be provided with its own internal DC power supply powered from the a.c. line.

In versions of the amplifier 100 in which the power supply to the amplifier electronics is not switched, a load resistor 129 is connected between the conductor 121, carrying the power supply current that is sensed by the current sensor 86, and one of the switched terminals 104 of the controlled switch 190. The other switched terminal 109 of the controlled switch is connected to the conductor 131 that carries the ground connection. The control input terminal 119 of the controlled switch is connected to the detector output 120. The value of the load resistor 129 is chosen so that when the controlled switch 190 is in its ON state, the current through the conductor 121, and hence through the current sensor 86, is well above the threshold current of the current sensor 86. This arrangement has the following advantages: an NPN transistor with a suitable current rating can be used for the controlled switch 190; the current drawn from the conductor 121 can be made completely independent of the current requirements of the amplifier 100; and the amplifier electronics 105 remain powered when the headset 146 is disconnected, which avoids unpleasant and potentially harmful transients in the earphone of the headset when the headset is reconnected.

Figure 6:
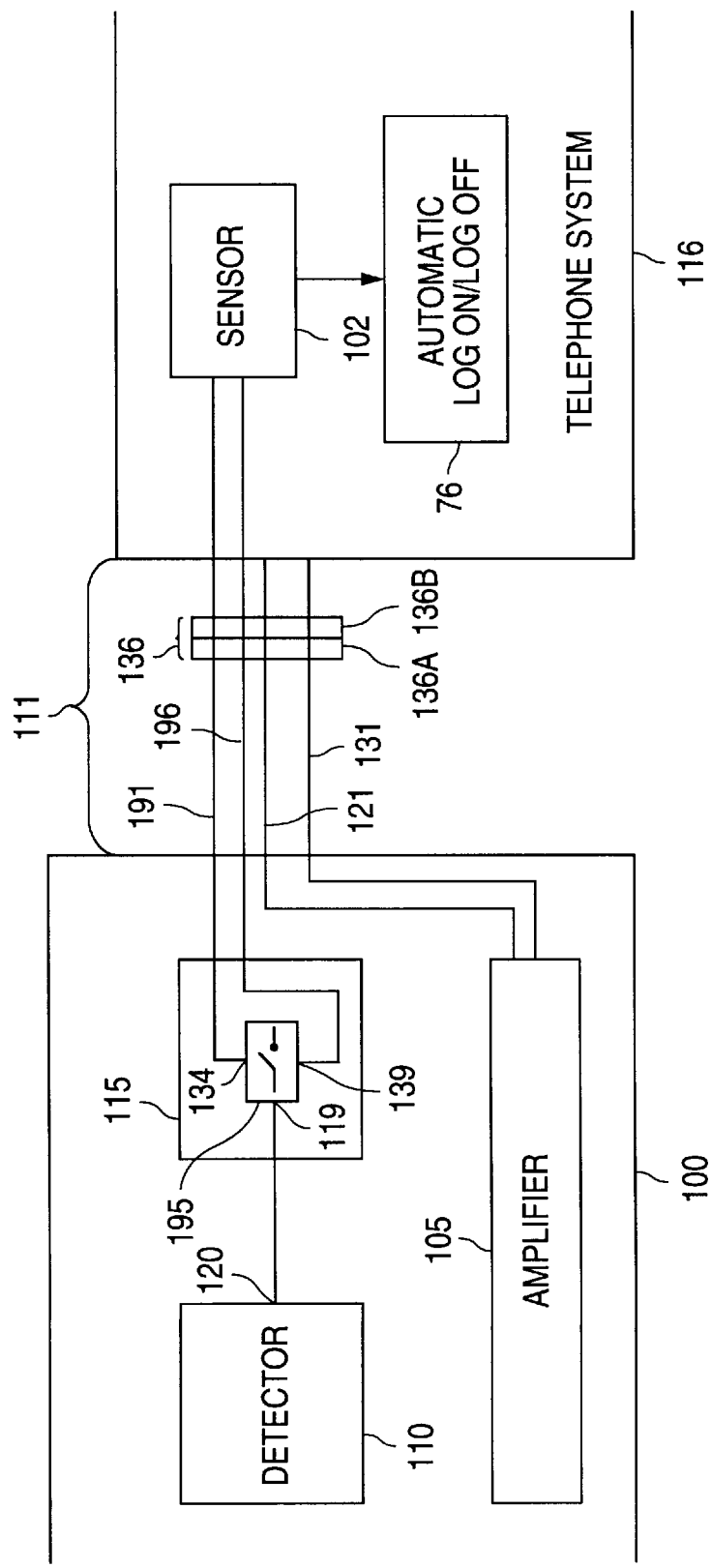
FIG. 6 is a block diagram of the activator part of a wireless telephone headset system with automatic log on/log off detection according to the invention in which the activator activates a resistance/voltage sensing type of automatic log on/log off system and the activator can activate both current sensing and resistance/voltage sensing automatic log on/log off systems.

A version of the activator 115 for use with a telephone system having an automatic log on/log off system that senses the change in resistance between two additional conductors in the cord 111 is shown in FIG. 6. In FIG. 6, the conductors 121, carrying the positive power supply, and 131, carrying the ground connection, are connected from the telephone system 116 to the amplifier electronics 105. The additional conductors 191 and 196 in the cord 111 are connected to the switched terminals 104 and 109 of the controlled switch 195. The control input terminal 119 of the controlled switch 195 is connected to the detector output 120.

When the detector output 120 is in one of its states, the controlled switch 195 is in its ON (conducting) state, and when the detector output is in the other of its states, the controlled switch 195 is in its OFF (non-conducting) state. When the controlled switch is ON, the conductor 191 is connected to the conductor 196 which, to the sensor 102 in the telephone system 116 appears the same as the amplifier being connected to the telephone system. When the controlled switch is OFF, the conductor 191 is not connected to the conductor 196 which, to the sensor in the telephone system appears the same as the amplifier not being connected to the telephone system. Thus, controlling the resistance between the conductors 191 and 196 by the controlled switch 195 activates the automatic log on/log off system in the telephone system.

When the telephone system has an automatic log on/log off system that senses the resistance or voltage between the contacts of a switch mounted on the socket 136B, the switch being operated by plugging the plug 136A into the socket, the additional conductors 191 and 196 must be connected either in series or in parallel with the switch, depending on the operating sense of the switch. Thus, if the switch is open when the plug 136 is plugged in, the additional conductors 191 and 196 must be connected in parallel with the switch. If the switch is closed when the plug 136 is plugged in, the additional conductors 191 and 196 must be connected in series with the switch.

The controlled switch 195 can be a relay, a transistor, an opto-relay or any other suitable switching device that can be controlled by a suitable control signal. Preferably, the controlled switch is of the type that has switched contacts that are isolated from the control terminal so that the amplifier can used with telephone systems having any type of automatic log on/log off sensor.

Figure 7:
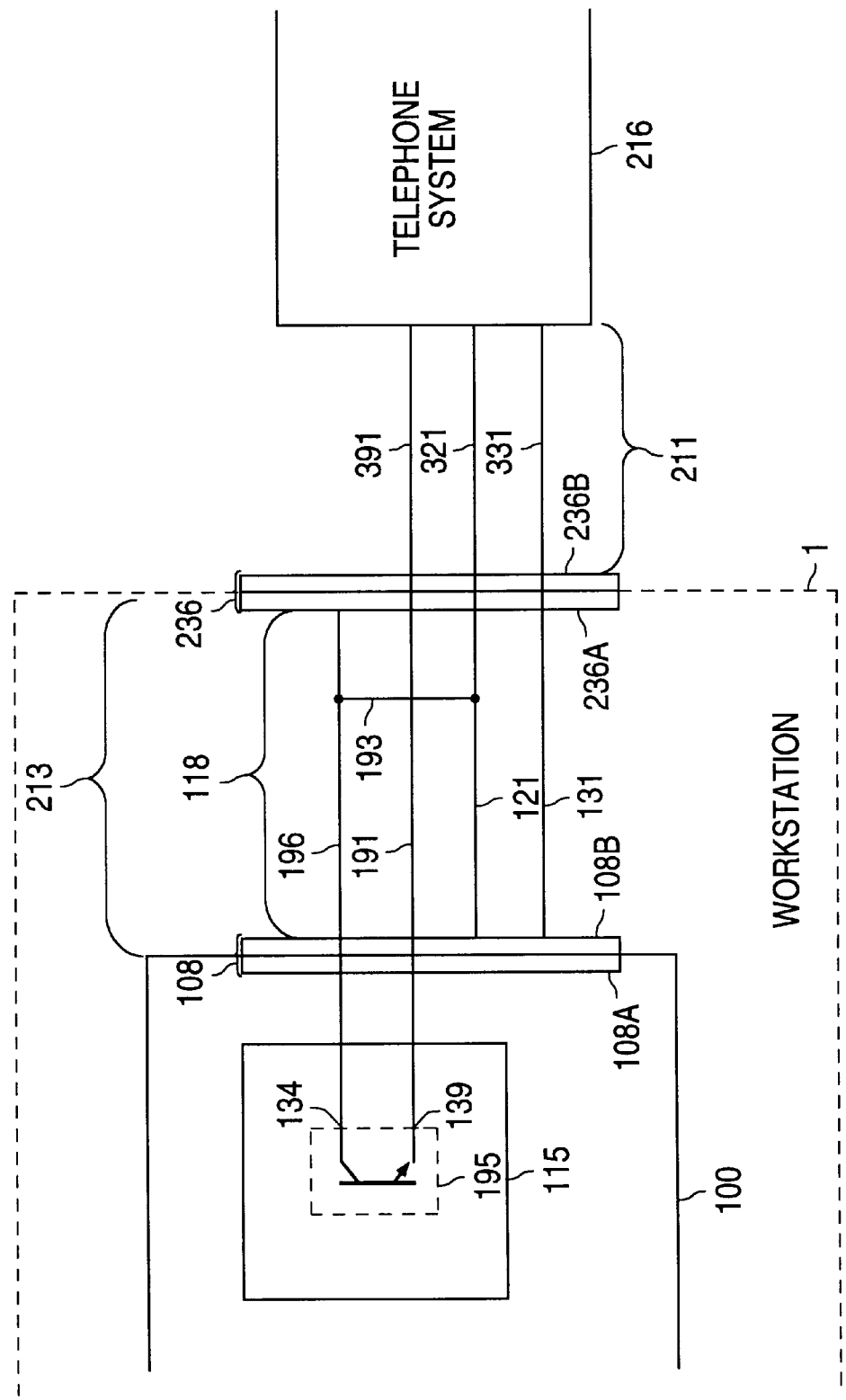
FIG. 7 is a block diagram of the activator part of a wireless telephone headset system with automatic log on/log off detection according to the invention showing how a different interconnect can be used to adapt the base unit for use with a different type of telephone system.

The ability of the amplifier according to the invention to work with telephone systems having different types of automatic log on/log off systems by using a different interconnect 213 is shown in FIG. 7. The telephone system 216 is connected to the socket 236B on the workstation 1 by a three-wire cord that includes the conductors 321 and 331 for power/signal and ground, respectively, and the additional conductor 391. The automatic log on/log off system in the telephone system 216 senses whether the additional conductor 391 is at the same potential as the positive supply conductor 321.

The interconnect 213 enables the amplifier 100 to operate the automatic log on/log off system of the telephone system 216, which is different from the automatic log on/log off systems in the telephone systems 116 shown in FIGS. 4–6. The interconnect 213 has the plug 108B that plugs into the socket 108A on the amplifier 100, and the plug 236A that is of the correct type to mate with the socket 236B on the workstation 1. The cord 118 has the conductors 121 and 131 for power supply/signal and ground, respectively, and the additional conductors 191 and 196. The additional conductors 191 and 196 are connected through the connector 108 to the switched contacts 134 and 139, respectively, of the second controlled switch 195 in the activator 115.

So that the second controlled switch 195 can change the voltage on the additional conductor 391, the interconnect 218 includes a link 183 between the conductor 121 carrying the positive supply voltage and the additional conductor 196. The link is shown mounted on the plug 236A, but it could alternatively be mounted on the plug 108B, or in the cord 118 between the plug 108B and the plug 136A.

When the second controlled switch 195 is ON, the additional conductor 191 is connected to the additional conductor 196, which is at the potential of the positive supply voltage. When the second controlled switch is OFF, the additional conductor 191 is at a voltage different from the voltage of the positive supply. The second controlled switch 195, together with the appropriate interconnect 218, controls the potential on the additional conductor 191 in such a way as to activate the voltage sensing automatic log on/log off system of the telephone system 216.

Figure 8:
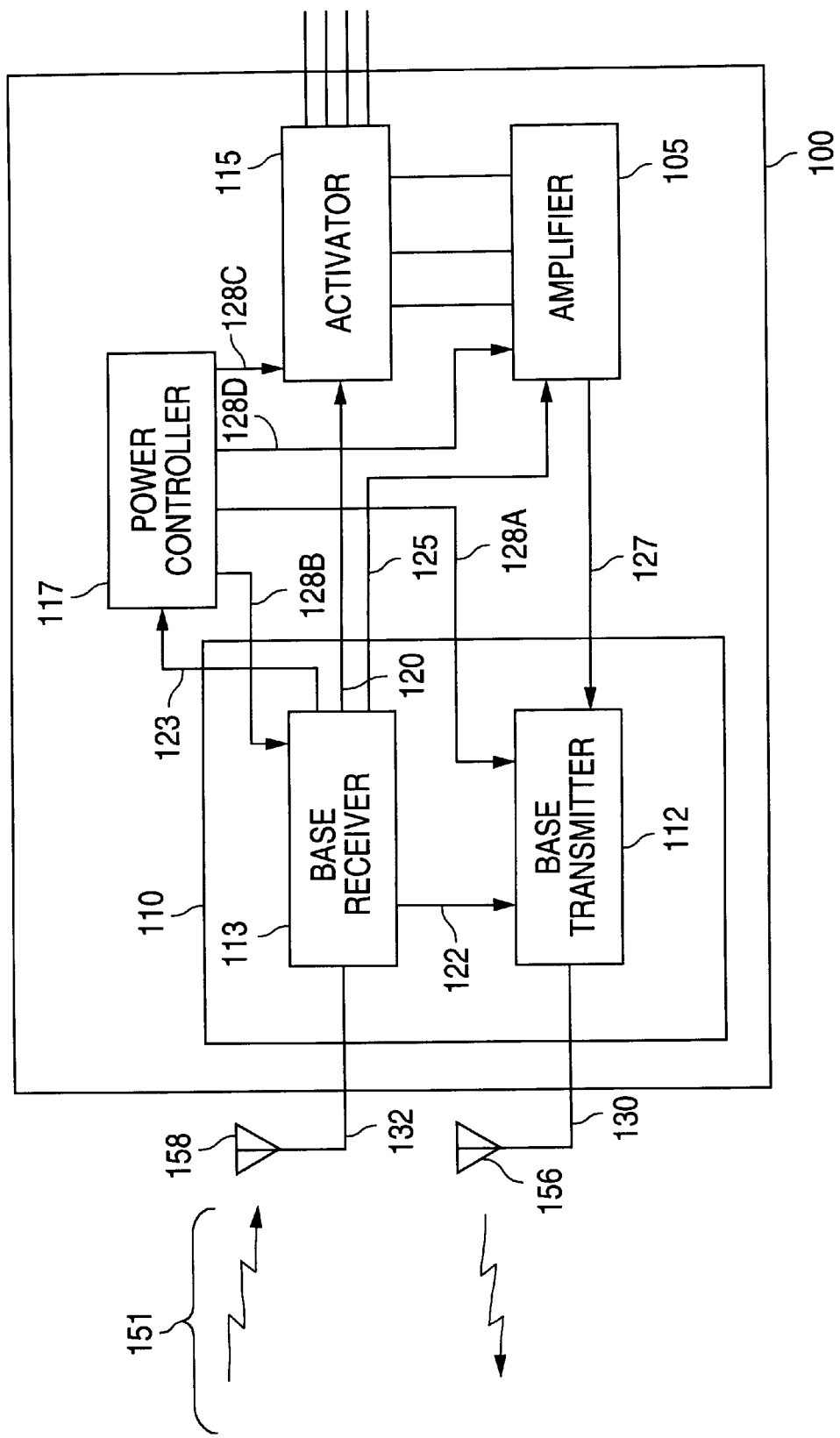
FIG. 8 is a block diagram of the base unit of a wireless telephone headset system with automatic log on/log off detection in accordance with one embodiment of the present invention.

Referring to FIG. 8, an amplifier 100 forming the base unit of a wireless telephone headset system in accordance with one embodiment of the present invention includes the amplifier electronics 105 and activator 115, as discussed above, plus a detector 110 having a base transmitter 112 and base receiver 113, and a power controller 117. The power controller 117 can be a power source such as a battery or an AC-to-DC power supply, or circuitry used for distributing power or controlling power otherwise provided to the amplifier electronics 105, activator 115, base transmitter 112 and base receiver 113.

As discussed in more detail below, the base transmitter 112 receives the audio signal 127 relayed by the amplifier electronics 105 from the telephone system 116 (FIG. 3) and appropriately converts it to an outgoing signal 130 for transmission (e.g. via RF or IR) to the headset via the transmit signal radiator 156 over the wireless communication link 151. Meanwhile, the base receiver 113 receives an incoming signal 132 via its receive signal radiator 158 from the headset 146 via the wireless communication link 151 and extracts (e.g. demodulates) the outgoing audio signal 125 for relaying to the telephone system 116 via the amplifier electronics 105 and activator 115. The base receiver 113 also provides the above-discussed detector output signal 120, a communication status signal 122 to the base transmitter 112 and a power control signal 123 to the power controller 117.

Additionally, the base transmitter 112 and receiver 113 operate to detect when the wireless communication link 151 is interrupted, or after such interruption has already occurred, to detect when the communication link 151 is reestablished. This detection function can be done in any of several ways. For example, in one embodiment, the base receiver 113 monitors the signal strength of its incoming signal 132. When the strength of this signal 132 falls below a predetermined threshold, the receiver 113 will have detected that the headset 146 has moved outside the range of communication. Accordingly, the receiver 113 provides the above-discussed output signal 120 to the activator 115. In another embodiment, the receiver 113 provides a control signal 122 to the transmitter 112 for the purpose of altering or discontinuing transmission of the outgoing signal 130 by the transmitter 112. In yet another embodiment, the receiver 113 generates a control signal 123 for the power controller 117 which, in turn, provides individual control or controlled-power signals 128A, 128B, 128C, 128D for selectively powering down portions of the transmitter 112, receiver 113, activator 115 and amplifier electronics 105, thereby saving on power and preventing spurious emission of wireless signals from the detector 110.

In still another embodiment, the base transmitter 112 also participates in the detection of interruption and reestablishment of the wireless communication link 151 with the headset 146. For example, the transmitter 112, as part of its output signal 130, includes an encoded query signal intended to query the corresponding headset 146 with which it is communicating. As long as the headset 146 continues to receive such a query signal, a corresponding response signal is sent by the headset 146 for reception by the base receiver 113 as part of its incoming signal 132. However, whenever the headset 146 is removed from communicating range with respect to the amplifier 100, it will no longer receive the query signal from the base transmitter 112 with sufficient signal strength and, accordingly, will alter or cease transmission of its response signal to the base receiver 113. When this happens (similar to the above-discussed case of receiving insufficient signal strength from the headset 146), the base receiver 113 provides the aforementioned output/control signals 120, 122, 123.

Figure 9:
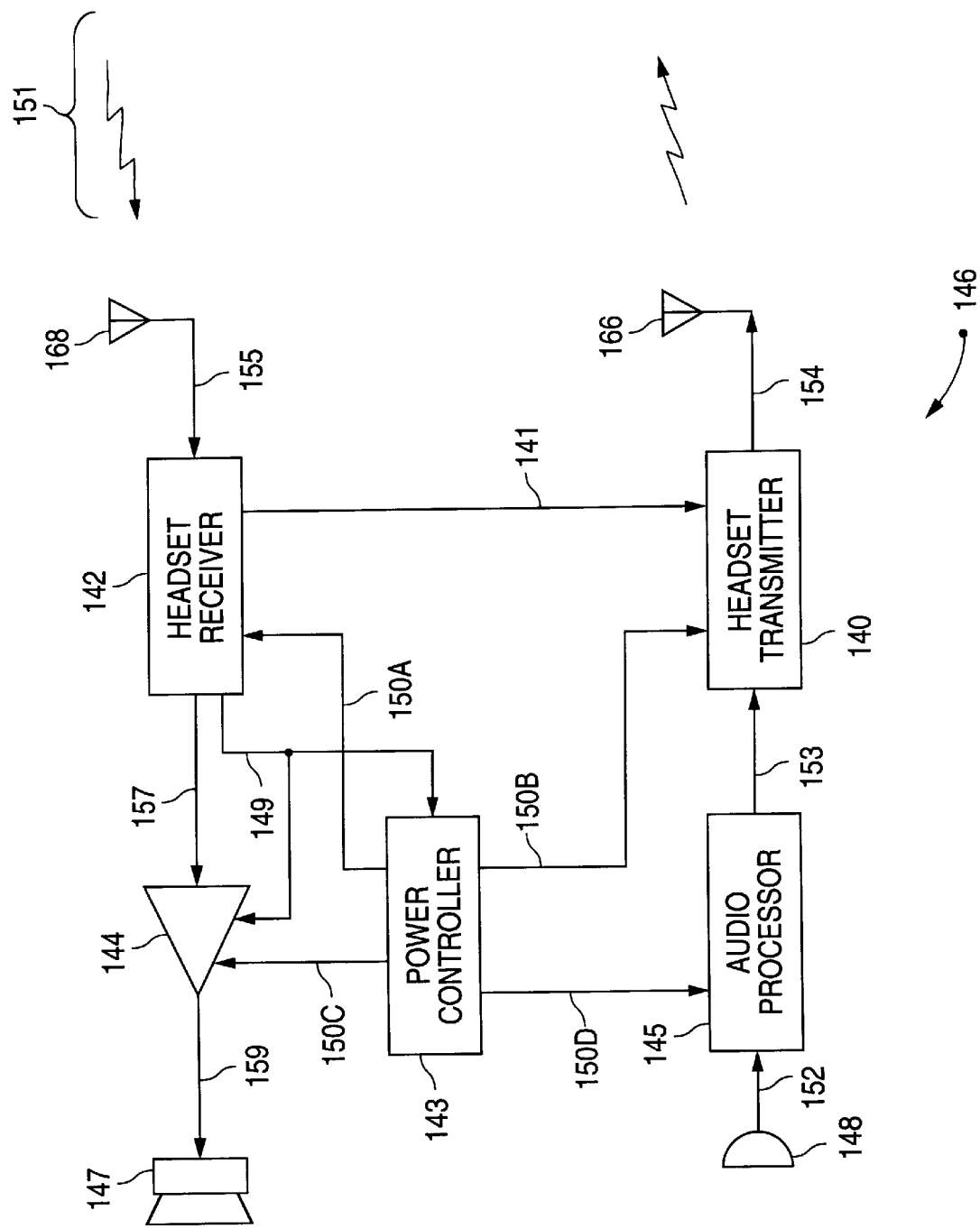
FIG. 9 is a block diagram of the headset unit of a wireless telephone headset system with automatic log on/log off detection in accordance with one embodiment of the present invention.

Referring to FIG. 9, the headset 146 includes a headset transmitter 140, receiver 142, power controller 143, audio amplifier 144, speaker 147, microphone 148 and audio processor 145 (in addition to the above-discussed signal radiators 166, 168). From the incoming signal 155, the receiver 142 provides an audio signal 157 which is amplified by the audio amplifier 144, with the amplified audio signal 159 then used to drive the speaker 147. An outgoing audio signal 152 generated by the microphone 148 is processed (e.g. amplified and filtered) by the audio processor 145, with the processed audio signal 153 then appropriately converted by the transmitter 140 for transmission via the transmit signal radiator 166.

Additionally, as discussed above, the headset receiver 142 can be used to detect an interruption in the wireless communication link 151. In one embodiment, the signal strength of its incoming signal 155 is monitored. When this signal strength falls below a predetermined threshold, e.g. when the headset 146 has moved outside of its range of communication with the amplifier 100, the receiver 142 generates a control signal 141 for the transmitter 140 and a control signal 149 for the audio amplifier 144 and power controller 143. In accordance with this control signal 141, the transmitter 140 alters or terminates its signal 154 transmission. The other control signal 149 operates as a squelch control for the audio amplifier 144 (e.g. to squelch static emissions from the speaker 147) and as a power control for the power controller 143 for providing individual control or controlled-power signals 150A, 150B, 150C, 150D for selectively powering down portions of the receiver 142, transmitter 140, audio processor 145 and audio amplifier 144, thereby conserving power and preventing spurious signal emissions from the headset 146.

In another embodiment, in accordance with the discussion above, the receiver 142, as part of its incoming signal 155 receives a query signal from the amplifier 100. When the receiver 142 stops receiving such query signal, e.g. when the wireless communication link 151 is interrupted, it sends the control signal 141 to the transmitter 140 to instruct it to so inform the amplifier 100 via the response signal portion of the outgoing signal 154.

It should be understood that the above-discussed query and response signals transmitted by the amplifier 100 and headset 146, respectively, can be in any of a number of well known forms. For example, they can be in the form of subcarrier signals or pilot tones or, where digital signals are used, in the form of one or more encoded bits embedded within the signals.

In a preferred embodiment of the present invention, the range within which the wireless communication link 151 between the amplifier 100 and headset 146 remains established is approximately 1.5–3 meters, with such range capable of being increased or decreased as desired by appropriately increasing or decreasing the signal strength of the signals communicated between the amplifier 100 and headset 146. When the wireless communication link 151 is interrupted, the telephone system 116 blocks calls from being routed to this particular amplifier 100, or where a call has already been routed, places such call on hold. As discussed above, this has the effect of emulating the unplugging, or disconnecting, of the amplifier 100 from the telephone system 116, even though the amplifier 100 remains connected to the telephone system 116.

Figure 10A:
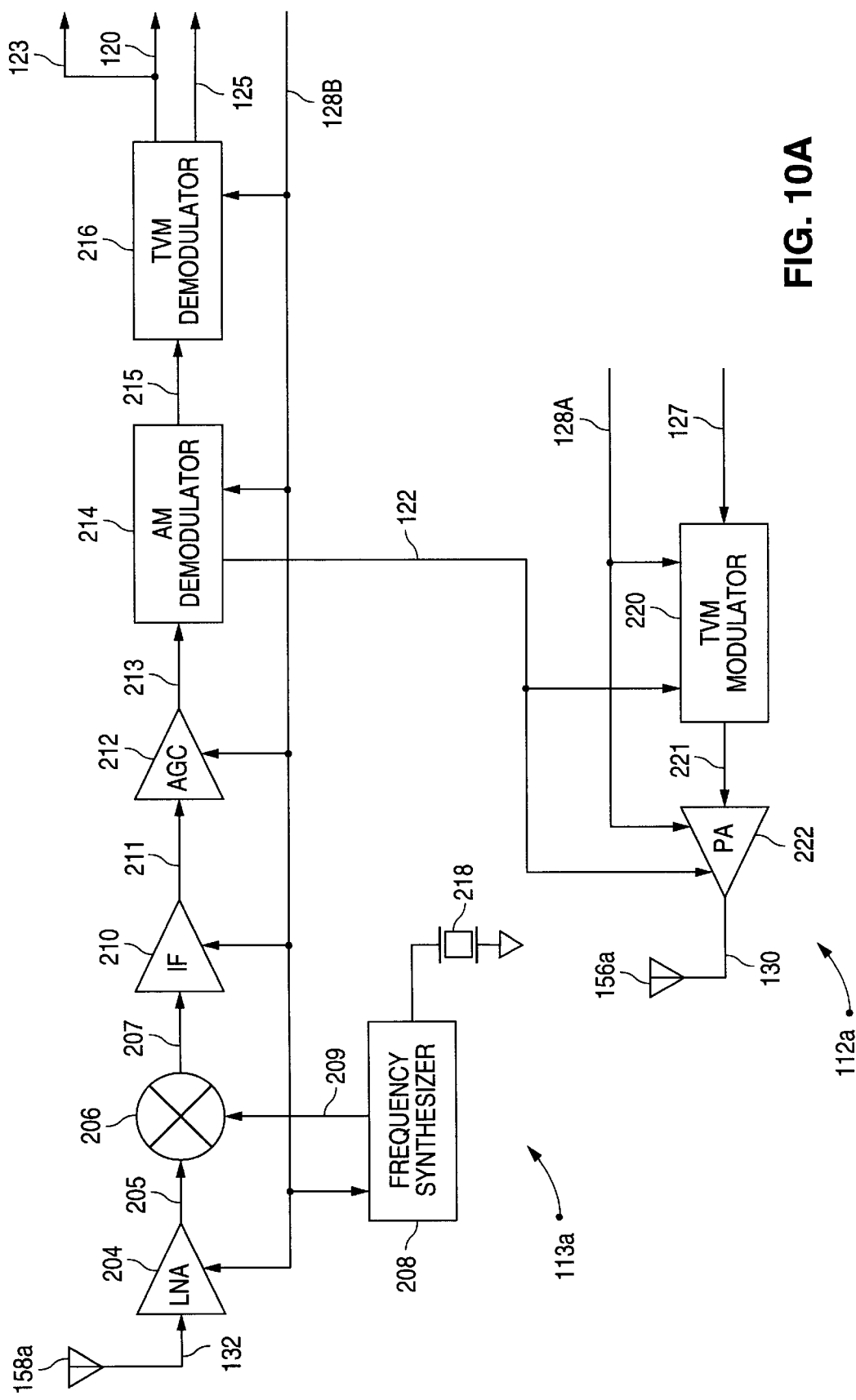
FIG. 10A is a block diagram of one embodiment of the base unit of FIG. 8 with a radio frequency transmitter and receiver.

Referring to FIG. 10A, one embodiment of the base unit of FIG. 8 includes an RF transmitter 112A and RF receiver 113A. The receiver 113A includes a low noise amplifier (LNA) 204, mixer 206, frequency synthesizer 208, IF amplifier 210, automatic gain-controlled (AGC) amplifier 212, amplitude modulation (AM) demodulator 214 and time-varying modulation (TVM: a form of pulse-width modulation) demodulator 216, connected substantially as shown. The transmitter 112A includes a TVM modulator 220 and power amplifier 222, connected substantially as shown.

In the receiver 113A, the LNA 204 receives the incoming signal 132 from an RF antenna 158A. The amplified signal 205 is frequency down converted in the mixer 206 with the local oscillator signal 209 provided by the frequency synthesizer 208, which is controlled by a crystal 218. The intermediate frequency (IF) signal 207 is amplified by the IF amplifier 210, with the amplified signal 211 further amplified with gain control by the AGC amplifier 212. The gain-controlled signal 213 is demodulated by the AM demodulator 214. The resulting signal 215 is further demodulated in the TVM demodulator 216 to produce the above-discussed detector output signal 120, power control signal 123 and outgoing audio signal 125.

In the transmitter 112A, the audio signal 127 from the amplifier electronics 105 (FIG. 8) is modulated by the TVM modulator 220. The modulated signal 221 is amplified by the power amplifier 222 to produce the outgoing signal 130 for transmission via a magnetic antenna 156A. The above-discussed communication status signal 122 is provided to the TVM modulator 220 and power amplifier 222 by the AM demodulator 214 in the receiver 113A.

Figure 10B:
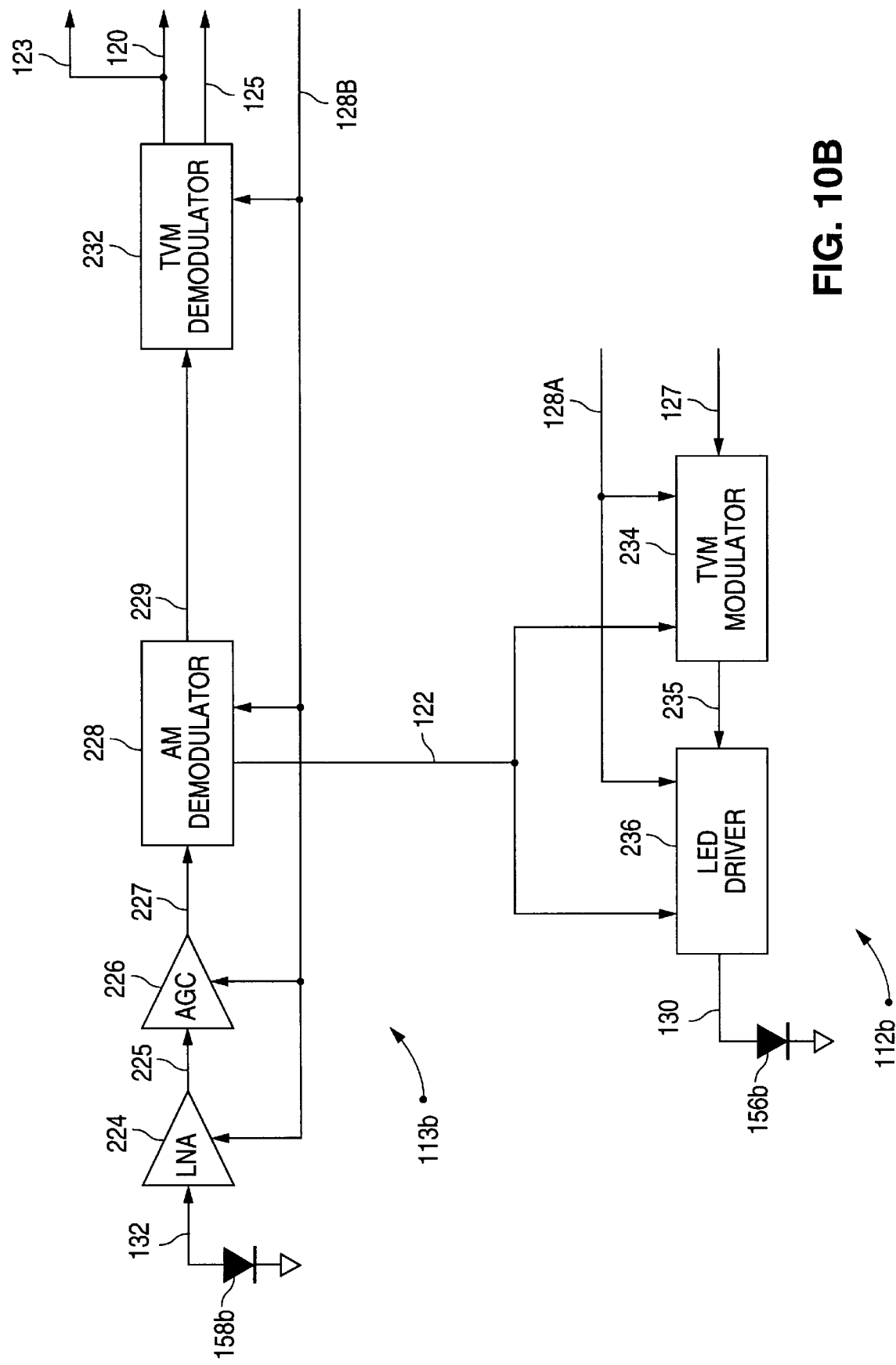
FIG. 10B is a block diagram of another embodiment of the base unit of FIG. 8 with an infrared transmitter and receiver.

Referring to FIG. 10B, another embodiment of the base unit of FIG. 8 includes an IR transmitter 112B and IR receiver 113B. The receiver 113B includes an LNA 224, AGC amplifier 226, AM demodulator 228 and TVM demodulator 232, connected substantially as shown. The transmitter 112B includes a TVM modulator 234 and light-emitting diode (LED) driver 236, connected substantially as shown.

In the receiver 113B, the incoming signal 132 is received from an IR-sensitive element (e.g. photodiode) 158B. The amplified signal 225 is further amplified with gain control by the AGC amplifier 226. The gain-controlled signal 227 is then sequentially demodulated by the AM demodulator 228 and TVM demodulator 232 to produce the above-discussed detector output signal 120, power control signal 123 and outgoing audio signal 125.

In the transmitter 112B, the TVM modulator 234 modulates the audio signal 127 from the amplifier electronics 105 (FIG. 8). The modulated signal 235 drives the LED driver 236 which provides the outgoing signal 130 to an IR-emitting element (e.g. photodiode) 156B. The above-discussed communication status signal 122 is provided to the TVM modulator 234 and LED driver 236 by the AM demodulator 228 in the receiver 113B.

Figure 11A:
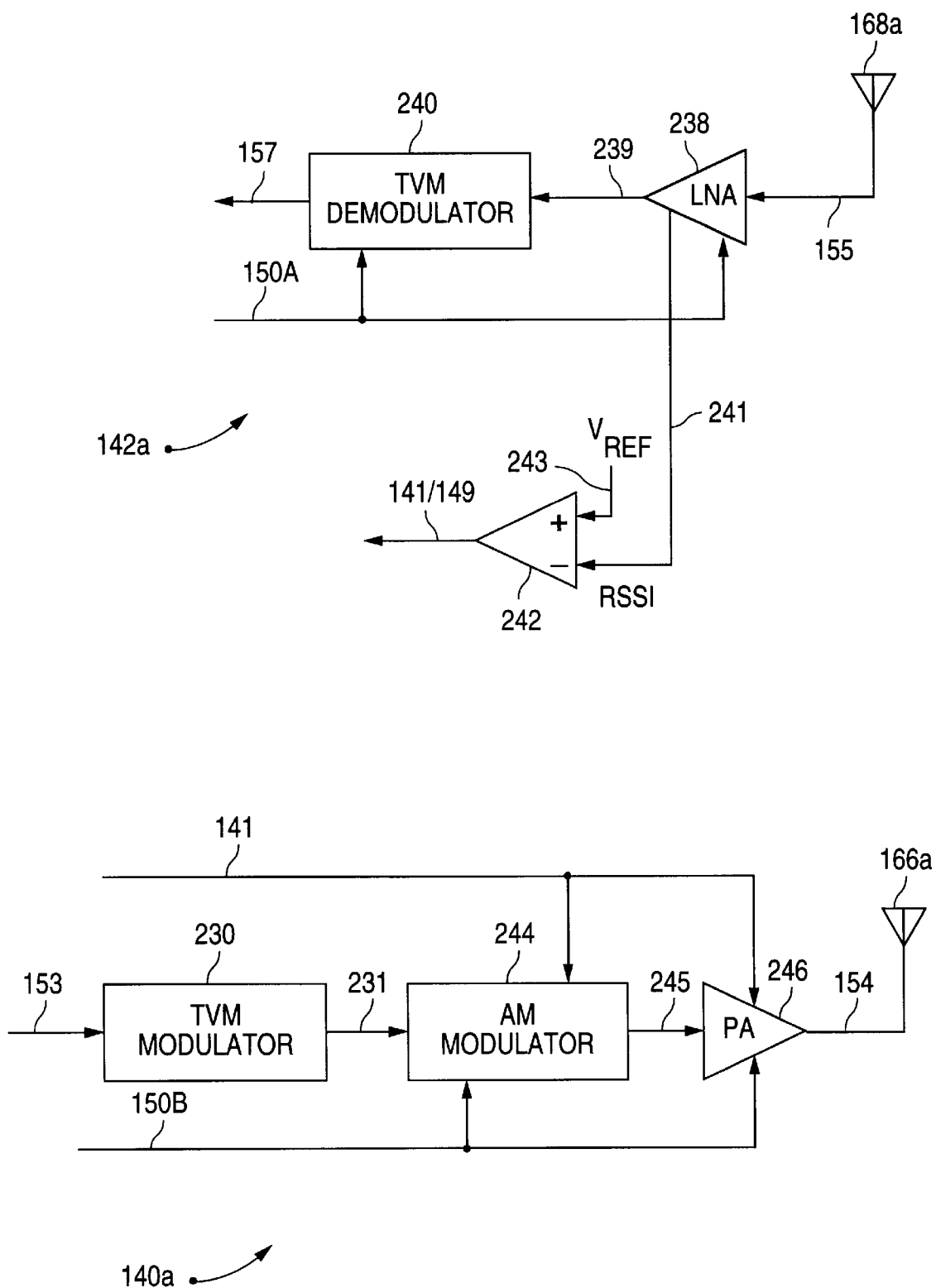
FIG. 11A is a block diagram of one embodiment of the headset unit of FIG. 9 with a radio frequency transmitter and receiver.

Referring to FIG. 11A, one embodiment of the headset unit of FIG. 9 includes an RF transmitter 140A and an RF receiver 142A. The receiver 142A includes an LNA 238, TVM demodulator 240 and comparator 242, connected substantially as shown. The transmitter 140A includes a TVM modulator 230, AM modulator 244 and power amplifier 246, connected substantially as shown.

In the receiver 142A, the incoming signal 155 from the RF antenna 168A is amplified by the LNA 238. The LNA 238 provides an amplified signal 239 which is demodulated by the TVM demodulator 240 to provide the audio signal 157 to the audio amplifier 144 (FIG. 9). The LNA 238 also provides a receive signal strength indicator (RSSI) signal 241 which is compared to a reference 243 by the comparator 242 to provide an output signal suitable for use as a control signal 141 for the transmitter 140A (e.g. a "mute" signal) and/or a control signal 149 for the audio amplifier 144 and power controller 143, as discussed above.

In the transmitter 140A, the processed audio signal 153 from the audio processor 145 (FIG. 9) is sequentially modulated by the TVM modulator 230 and AM modulator 244. The resulting modulated signal 245 is amplified by the power amplifier 246 to provide the outgoing signal 154 to the magnetic antenna 166A.

Figure 11B:
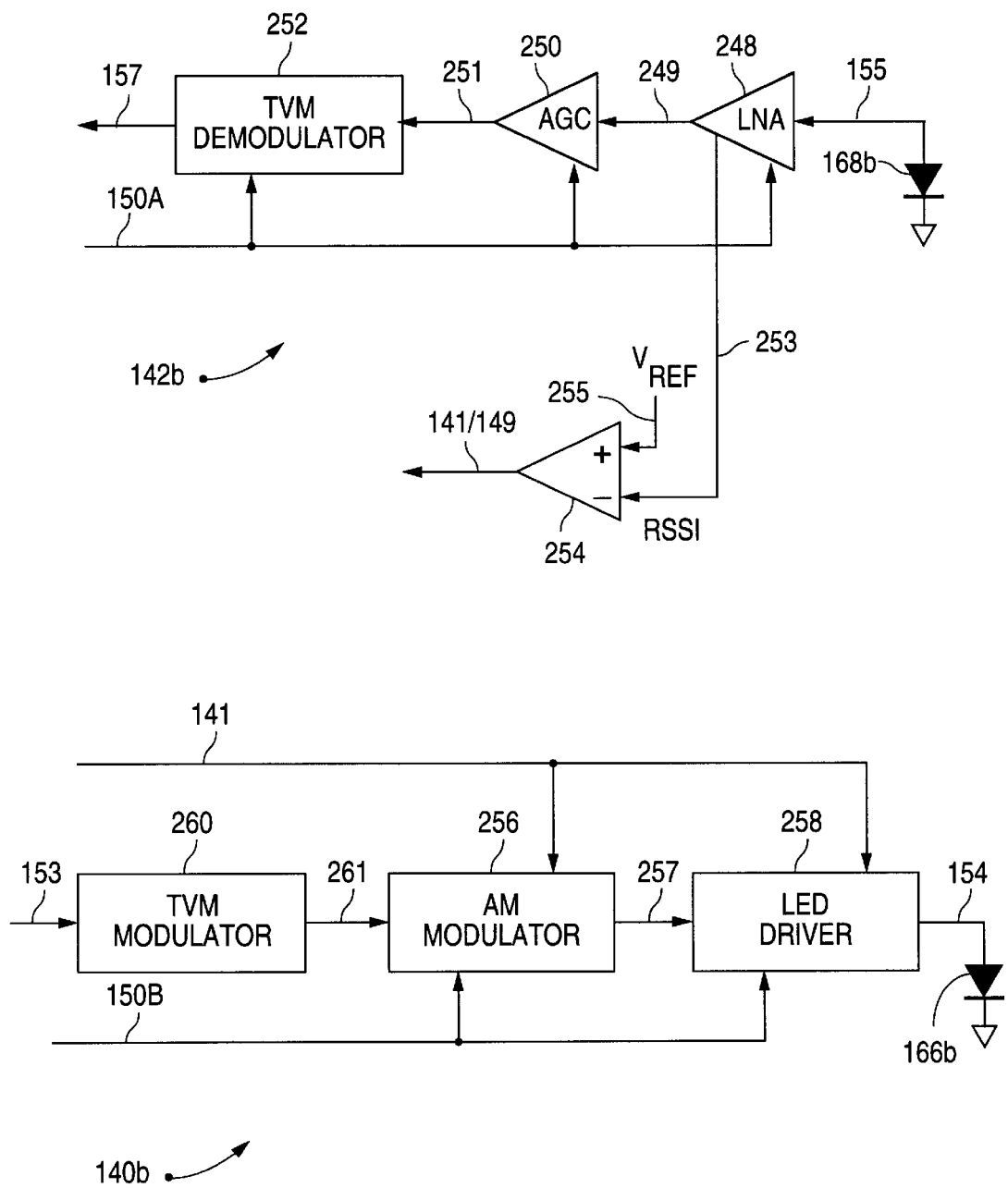
FIG. 11B is a block diagram of another embodiment of the headset unit of FIG. 9 with an infrared transmitter and receiver.

Referring to FIG. 11B, another embodiment of the headset unit of FIG. 9 includes an IR transmitter 140B and an IR receiver 142B. The receiver 142B includes an LNA 248, AGC amplifier 250, TVM demodulator 252 and comparator 254, connected substantially as shown. The transmitter 140B includes a TVM modulator 260, AM modulator 256 and LED driver 258, connected substantially as shown.

In the receiver 142B, the incoming signal 155 from an IR-sensitive element (e.g. photodiode) 168B is amplified by the LNA 248. The amplified output 249 is further amplified with gain control by the AGC amplifier 250, with the resulting signal 251 being demodulated by the TVM demodulator 252 to provide the audio signal 157. The LNA 248 further provides an RSSI signal 253 for comparison with a reference 255 by the comparator 254 to provide a control signal suitable for the above-discussed control signals 141, 149 for the transmitter 140B and/or audio amplifier 144 and power controller 143 (FIG. 9).

In the transmitter 140B, the processed audio signal 153 is sequentially modulated by the TVM modulator 260 and AM modulator 256. The resulting modulated signal 257 is used by the LED driver 258 to provide the outgoing signal 154 for transmission via an IR-emitting element (e.g. photodiode) 166B.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the amplifier comprising:

a detector for
  detecting an interruption of a wireless communication link between the telephone headset and the amplifier and providing an output signal in accordance therewith and
  detecting when the wireless communication link is reestablished between the telephone headset and the amplifier and in accordance therewith providing another output signal; and an activator, coupled to the detector, for
receiving the output signal and in accordance therewith changing the parameter in a manner which emulates a disconnection of a peripheral device from the telephone system even though the amplifier remains connected to the telephone system, and changing, in accordance with the another output signal, the parameter in a manner which emulates a reconnection of the peripheral device to the telephone system even though the amplifier has not been disconnected.

2. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the amplifier comprising:

a detector for
detecting an interruption of a wireless communication link between the telephone headset and the amplifier and providing an output signal in accordance therewith,
providing the output signal in a first state in accordance with the detection of an interruption of the wireless communication link, and
detecting when the wireless communication link is reestablished between the telephone headset and amplifier and in accordance therewith providing the output signal in a second state; and an activator, coupled to the detector, for
receiving the output signal and in accordance therewith changing the parameter in a manner which emulates a disconnection of a peripheral device from the telephone system even though the amplifier remains connected to the telephone system,
changing, in accordance with the first output signal state, the parameter in a manner which emulates a disconnection of the peripheral device from the telephone system even though the amplifier remains connected, and
changing, in accordance with the second output signal state, the parameter in a manner which emulates a reconnection of the peripheral device to the telephone system even though the amplifier has not been disconnected.

3. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom, and wherein the amplifier and telephone headset together are for establishing a wireless communication link therebetween for communicating signals between the telephone headset and the telephone system, the amplifier comprising:

a detector for detecting an interruption of a wireless communication link between the telephone headset and the amplifier and providing an output signal in accordance therewith, wherein the detector comprises a transceiver for transmitting a first wireless signal to and receiving a second wireless signal from the telephone headset, and wherein the transceiver comprises
a radio frequency (RF) transceiver for transmitting a first RF signal to and receiving a second RF signal from the telephone headset, and
a magnetic antenna for transmitting the first RF signal and an RF antenna for receiving the second RF signal; and an activator, coupled to the detector, for receiving the output signal and in accordance therewith changing the parameter in a manner which emulates a disconnection of a peripheral device from the telephone system even though the amplifier remains connected to the telephone system.

4. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the amplifier comprising:

a detector for
detecting an interruption of a wireless communication link between the telephone headset and the amplifier and providing an output signal in accordance therewith, and
detecting when the wireless communication link is reestablished between the telephone headset and the amplifier and in accordance therewith providing another output signal,
wherein the detector comprises a transceiver for transmitting a first wireless signal to and receiving a second wireless signal from the telephone headset; and an activator, coupled to the detector, for
receiving the output signal and in accordance therewith changing the parameter in a manner which emulates a disconnection of a peripheral device from the telephone system even though the amplifier remains connected to the telephone system, and
changing, in accordance with the another output signal, the parameter in a manner which emulates a reconnection of the peripheral device to the telephone system even though the amplifier has not been disconnected.

5. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the amplifier comprising:

a detector for
detecting an interruption of a wireless communication link between the telephone headset and the amplifier and providing an output signal in accordance therewith,
providing the output signal in a first state in accordance with the detection of an interruption of the wireless communication link, and detecting when the wireless communication link is reestablished between the telephone headset and amplifier and in accordance therewith providing the output signal in a second state, wherein the detector comprises a transceiver for transmitting a first wireless signal to and receiving a second wireless signal from the telephone headset; and an activator, coupled to the detector, for receiving the output signal and in accordance therewith changing the parameter in a manner which emulates a disconnection of a peripheral device from the telephone system even though the amplifier remains connected to the telephone system, changing, in accordance with the first output signal state, the parameter in a manner which emulates a disconnection of the peripheral device from the telephone system even though the amplifier remains connected, and changing, in accordance with the second output signal state, the parameter in a manner which emulates a reconnection of the peripheral device to the telephone system even though the amplifier has not been disconnected.

6. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the parameter is a current drawn from the telephone system, and further wherein the amplifier and telephone headset together are for establishing a wireless communication link therebetween for communicating signals between the telephone headset and the telephone system, the amplifier comprising:

a detector for detecting an interruption of a wireless communication link between the telephone headset and the amplifier and providing an output signal in accordance therewith, and detecting when the wireless communication link is reestablished between the telephone headset and the amplifier and in accordance therewith providing another output signal;

a current drawing circuit for drawing a current from the telephone system; and an activator, coupled to the detector, for receiving the output signal and in accordance therewith changing the parameter in a manner which emulates a disconnection of a peripheral device from the telephone system even though the amplifier remains connected to the telephone system, changing, in accordance with the output signal, the current drawn from the telephone system by the current drawing circuit, and changing, in accordance with the another output signal, the parameter in a manner which emulates a reconnection of the peripheral device to the telephone system even though the amplifier has not been disconnected.

7. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the parameter is a current drawn from the telephone system, and further wherein the amplifier and telephone headset together are for establishing a wireless communication link therebetween for communicating signals between the telephone headset and the telephone system, the amplifier comprising:

a detector for detecting an interruption of a wireless communication link between the telephone headset and the amplifier and providing an output signal in accordance therewith, providing the output signal in a first state in accordance with the detection of an interruption of the wireless communication link, and detecting when the wireless communication link is reestablished between the telephone headset and amplifier and in accordance therewith providing the output signal in a second state;

a current drawing circuit for drawing a current from the telephone system; and an activator, coupled to the detector, for receiving the output signal and in accordance therewith changing the parameter in a manner which emulates a disconnection of a peripheral device from the telephone system even though the amplifier remains connected to the telephone system, changing, in accordance with the output signal, the current drawn from the telephone system by the current drawing circuit, changing, in accordance with the first output signal state, the parameter in a manner which emulates a disconnection of the peripheral device from the telephone system even though the amplifier remains connected, and changing, in accordance with the second output signal state, the parameter in a manner which emulates a reconnection of the peripheral device to the telephone system even though the amplifier has not been disconnected.

8. An apparatus including an amplifier for communicating wirelessly with a telephone headset and connecting to a telephone system, wherein the telephone system includes a monitor for monitoring when a peripheral device is connected thereto and detecting a change in a parameter which occurs when the peripheral device is disconnected therefrom, wherein the parameter is a resistance, and further wherein the amplifier and telephone headset together are for establishing a wireless communication link therebetween for communicating signals between the telephone headset and the telephone system, the amplifier comprising:

a controllable resistance;

a detector for detecting an interruption of a wireless communication link between the telephone headset and the amplifier and providing an output signal in accordance therewith; and an activator, coupled to the detector, for receiving the output signal and in accordance therewith changing the parameter in a manner which emulates a disconnection of a peripheral device from the telephone system even though the amplifier remains connected to the telephone system, and changing the controllable resistance in accordance with the output signal.

9. The apparatus of claim 8, wherein the telephone system monitor is further for detecting a change in the parameter which occurs when the peripheral device is reconnected to the telephone system, and wherein:

the detector is further for detecting when the wireless communication link is reestablished between the telephone headset and the amplifier and in accordance therewith providing another output signal; and the activator is further for changing the parameter, in accordance with the another output signal, in a manner which emulates a reconnection of the peripheral device to the telephone system even though the amplifier has not been disconnected.

10. The apparatus of claim 8, wherein the telephone system monitor is further for detecting a change in the parameter which occurs when the peripheral device is reconnected to the telephone system, and wherein:

the detector is for providing the output signal in a first state in accordance with the detection of an interruption of the wireless communication link;

the activator, in accordance with the first output signal state, is for changing the parameter in a manner which emulates a disconnection of the peripheral device from the telephone system even though the amplifier remains connected;

the detector is further for detecting when the wireless communication link is reestablished between the telephone headset and amplifier and in accordance therewith providing the output signal in a second state; and the activator, in accordance with the second output signal state, is further for changing the parameter in a manner which emulates a reconnection of the peripheral device to the telephone system even though the amplifier has not been disconnected.

11. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier;

providing an output signal in accordance with the detection of an interruption of the wireless communication link; and changing the parameter, in accordance with the output signal, in a manner which emulates a disconnection of a peripheral device from the telephone system even though the amplifier remains connected to the telephone system;

detecting when the wireless communication link is reestablished between the telephone headset and the amplifier;

providing another output signal in accordance with the detection of a reestablishment of the wireless communication link; and changing the parameter, in accordance with the another output signal, in a manner which emulates a reconnection of the peripheral device to the telephone system even though the amplifier has not been disconnected.

12. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier;

providing an output signal in a first state in accordance with the detection of an interruption of the wireless communication link; and changing the parameter, in accordance with the first output signal state, in a manner which emulates a disconnection of a peripheral device from the telephone system even though the amplifier remains connected to the telephone system;

detecting when the wireless communication link is reestablished between the telephone headset and amplifier;

providing the output signal in a second state in accordance with the detection of a reestablishment of the wireless communication link; and changing the parameter, in accordance with the second output signal state, in a manner which emulates a reconnection of the peripheral device to the telephone system even though the amplifier has not been disconnected.

13. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier by transmitting with a magnetic antenna a first wireless radio frequency (RF) signal to the telephone headset and receiving with an RF antenna a second wireless RF signal from the telephone headset;

providing an output signal in accordance with the detection of an interruption of the wireless communication link; and changing the parameter, in accordance with the output signal, in a manner which emulates a disconnection of a peripheral device from the telephone system even though the amplifier remains connected to the telephone system.

14. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier by transmitting a first wireless signal to and receiving a second wireless signal from the telephone headset;

providing an output signal in accordance with the detection of an interruption of the wireless communication link; and changing the parameter, in accordance with the output signal, in a manner which emulates a disconnection of a peripheral device from the telephone system even though the amplifier remains connected to the telephone system;

detecting when the wireless communication link is reestablished between the telephone headset and the amplifier;

providing another output signal in accordance with the detection of a reestablishment of the wireless communication link; and changing the parameter, in accordance with the another output signal, in a manner which emulates a reconnection of the peripheral device to the telephone system even though the amplifier has not been disconnected.

15. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier by transmitting a first wireless signal to and receiving a second wireless signal from the telephone headset;

providing an output signal in a first state in accordance with the detection of an interruption of the wireless communication link;

changing the parameter, in accordance with the first output signal state, in a manner which emulates a disconnection of a peripheral device from the telephone system even though the amplifier remains connected to the telephone system;

detecting when the wireless communication link is reestablished between the telephone headset and amplifier;

providing the output signal in a second state in accordance with the detection of a reestablishment of the wireless communication link; and changing the parameter, in accordance with the second output signal state, in a manner which emulates a reconnection of the peripheral device to the telephone system even though the amplifier has not been disconnected.

16. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom, and wherein the amplifier and telephone headset together are for establishing a wireless communication link therebetween for communicating signals between the telephone headset and the telephone system, the method comprising the steps of:

the telephone system monitor is further for detecting a change in the parameter which occurs when the peripheral device is reconnected to the telephone system detecting an interruption of a wireless communication link between the telephone headset and the amplifier;

providing an output signal in accordance with the detection of an interruption of the wireless communication link; and changing the parameter, in accordance with the output signal, in a manner which emulates a disconnection of a peripheral device from the telephone system even though the amplifier remains connected to the telephone system by changing a current drawn from the telephone system by a current drawing circuit within the amplifier;

detecting when the wireless communication link is reestablished between the telephone headset and the amplifier;

providing another output signal in accordance with the detection of a reestablishment of the wireless communication link; and changing the parameter, in accordance with the another output signal, in a manner which emulates a reconnection of the peripheral device to the telephone system even though the amplifier has not been disconnected.

17. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier;

providing an output signal in a first state in accordance with the detection of an interruption of the wireless communication link; and changing the parameter, in accordance with the first output signal state, in a manner which emulates a disconnection of a peripheral device from the telephone system even though the amplifier remains connected to the telephone system by changing a current drawn from the telephone system by a current drawing circuit within the amplifier;

detecting when the wireless communication link is reestablished between the telephone headset and amplifier;

providing the output signal in a second state in accordance with the detection of a reestablishment of the wireless communication link;

and changing the parameter, in accordance with the second output signal state, in a manner which emulates a reconnection of the peripheral device to the telephone system even though the amplifier has not been disconnected.

18. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier;

providing an output signal in accordance with the detection of an interruption of the wireless communication link; and changing the parameter, in accordance with the output signal, in a manner which emulates a disconnection of a peripheral device from the telephone system even though the amplifier remains connected to the telephone system by changing a controllable resistance within the amplifier;

detecting when the wireless communication link is reestablished between the telephone headset and the amplifier;

providing another output signal in accordance with the detection of a reestablishment of the wireless communication link; and changing the parameter, in accordance with the another output signal, in a manner which emulates a reconnection of the peripheral device to the telephone system even though the amplifier has not been disconnected.

19. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of a wireless communication link between the telephone headset and the amplifier;

providing an output signal in a first state in accordance with the detection of an interruption of the wireless communication link; and changing the parameter, in accordance with the first output signal state, in a manner which emulates a disconnection of a peripheral device from the telephone system even though the amplifier remains connected to the telephone system by changing a controllable resistance within the amplifier;

detecting when the wireless communication link is reestablished between the telephone headset and amplifier;

providing the output signal in a second state in accordance with the detection of a reestablishment of the wireless communication link; and changing the parameter, in accordance with the second output signal state, in a manner which emulates a reconnection of the peripheral device to the telephone system even though the amplifier has not been disconnected.

20. An apparatus including a telephone headset for communicating wirelessly with an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the telephone headset comprising:

a detector for
    detecting an interruption of the wireless communication link between the telephone headset and the amplifier and providing an output signal in accordance therewith, and
    detecting when the wireless communication link is reestablished between the telephone headset and the amplifier and in accordance therewith providing another output signal; and a controller, coupled to the detector, for
    receiving the output signal and in accordance therewith providing one or more control signals for controlling one or more operating parameters of the telephone headset, and
    providing one or more other control signals, in accordance with the another output signal, for further controlling the one or more operating parameters of the telephone headset.

21. An apparatus including a telephone headset for communicating wirelessly with an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the telephone headset comprising:

a detector for
    detecting an interruption of the wireless communication link between the telephone headset and the amplifier and providing an output signal in a first state in accordance therewith, and
    detecting when the wireless communication link is reestablished between the telephone headset and amplifier and in accordance therewith providing the output signal in a second state; and a controller, coupled to the detector, for
    receiving the output signal and in accordance with the first output signal state providing one or more control signals for controlling one or more operating parameters of the telephone headset, and providing one or more other control signals, in accordance with the second output signal state, for further controlling the one or more operating parameters of the telephone headset.

22. An apparatus including a telephone headset for communicating wirelessly with an amplifier which is connected to a telephone system, wherein the telephone system includes a monitor for monitoring when a peripheral device is connected thereto and detecting a change in a parameter which occurs when the peripheral device is disconnected therefrom, and wherein the amplifier and telephone headset together are for establishing a wireless communication link therebetween for communicating signals between the telephone headset and the telephone system, the telephone headset comprising:

a detector for detecting an interruption of the wireless communication link between the telephone headset and the amplifier and providing an output signal in accordance therewith, wherein the detector comprises a transceiver for transmitting a first wireless signal to and receiving a second wireless signal from the amplifier, and wherein the transceiver comprises
a radio frequency (RF) transceiver for transmitting a first RF signal to and receiving a second RF signal from the amplifier, and
an RF antenna for transmitting the first RF signal and a magnetic antenna for receiving the second RF signal; and a controller, coupled to the detector, for receiving the output signal and in accordance therewith providing one or more control signals for controlling one or more operating parameters of the telephone headset.

23. An apparatus including a telephone headset for communicating wirelessly with an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the telephone headset comprising:

a detector for
detecting an interruption of the wireless communication link between the telephone headset and the amplifier and providing an output signal in accordance therewith, and
detecting when the wireless communication link is reestablished between the telephone headset and the amplifier and in accordance therewith providing another output signal,
wherein the detector comprises a transceiver for transmitting a first wireless signal to and receiving a second wireless signal from the amplifier; and a controller, coupled to the detector, for
receiving the output signal and in accordance therewith providing one or more control signals for controlling one or more operating parameters of the telephone headset, and
providing one or more other control signals, in accordance with the another output signal, for further controlling the one or more operating parameters of the telephone headset.

24. An apparatus including a telephone headset for communicating wirelessly with an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the telephone headset comprising:

a detector for
detecting an interruption of the wireless communication link between the telephone headset and the amplifier and providing an output signal in a first state in accordance therewith, and
detecting when the wireless communication link is reestablished between the telephone headset and amplifier and in accordance therewith providing the output signal in a second state,
wherein the detector comprises a transceiver for transmitting a first wireless signal to and receiving a second wireless signal from the amplifier; and a controller, coupled to the detector, for
receiving the output signal and in accordance with the first output signal state providing one or more control signals for controlling one or more operating parameters of the telephone headset, and
providing one or more other control signals, in accordance with the second output signal state, for further controlling the one or more operating parameters of the telephone headset.

25. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of the wireless communication link between the telephone headset and the amplifier;
providing an output signal in accordance with the detection of an interruption of the wireless communication link; and
providing one or more control signals, in accordance with the output signal, for controlling one or more operating parameters of the telephone headset;
detecting when the wireless communication link is reestablished between the telephone headset and the amplifier;
providing another output signal in accordance with the detection of a reestablishment of the wireless communication link; and
providing one or more other control signals, in accordance with the another output signal, for further controlling the one or more operating parameters of the telephone headset.

26. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of the wireless communication link between the telephone headset and the amplifier;

providing an output signal in a first state in accordance with the detection of an interruption of the wireless communication link; and providing one or more control signals, in accordance with the first output signal state, for controlling one or more operating parameters of the telephone headset;

detecting when the wireless communication link is reestablished between the telephone headset and amplifier;

providing the output signal in a second state in accordance with the detection of a reestablishment of the wireless communication link; and providing one or more other control signals, in accordance with the second output signal state, for further controlling the one or more operating parameters of the telephone headset.

27. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom, and wherein the amplifier and telephone headset together are for establishing a wireless communication link therebetween for communicating signals between the telephone headset and the telephone system, the method comprising the steps of:

detecting an interruption of the wireless communication link between the telephone headset and the amplifier by transmitting with an RF antenna a first wireless radio frequency (RF) signal to the amplifier and receiving with a magnetic antenna a second wireless RF signal from the amplifier;

providing an output signal in accordance with the detection of an interruption of the wireless communication link; and providing one or more control signals, in accordance with the output signal, for controlling one or more operating parameters of the telephone headset.

28. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of the wireless communication link between the telephone headset and the amplifier by communicating one or more wireless signals between the telephone headset and the amplifier;

providing an output signal in accordance with the detection of an interruption of the wireless communication link; and providing one or more control signals, in accordance with the output signal, for controlling one or more operating parameters of the telephone headset, detecting when the wireless communication link is reestablished between the telephone headset and the amplifier;

providing another output signal in accordance with the detection of a reestablishment of the wireless communication link; and providing one or more other control signals, in accordance with the another output signal, for further controlling the one or more operating parameters of the telephone headset.

29. A method of communicating wirelessly with a telephone headset and an amplifier which is connected to a telephone system, wherein the telephone system includes a monitor for monitoring when a peripheral device is connected thereto and detecting a change in a parameter which occurs when the peripheral device is disconnected therefrom and for detecting a change in the parameter which occurs when the peripheral device is reconnected to the telephone system, and wherein the amplifier and telephone headset together are for establishing a wireless communication link therebetween for communicating signals between the telephone headset and the telephone system, the method comprising the steps of:

detecting an interruption of the wireless communication link between the telephone headset and the amplifier by communicating one or more wireless signals between the telephone headset and the amplifier;

providing an output signal in a first state in accordance with the detection of an interruption of the wireless communication link; and providing one or more control signals, in accordance with the first output signal state, for controlling one or more operating parameters of the telephone headset;

detecting when the wireless communication link is reestablished between the telephone headset and amplifier;

providing the output signal in a second state in accordance with the detection of a reestablishment of the wireless communication link; and providing one or more other control signals, in accordance with the second output signal state, for further controlling the one or more operating parameters of the telephone headset.

\* \* \* \* \*